United States Patent
Zhang et al.

(10) Patent No.: US 11,644,812 B2
(45) Date of Patent: May 9, 2023

(54) MACHINE TOOL MANAGEMENT METHOD, MACHINE TOOL MANAGEMENT SYSTEM AND MEDIUM

(71) Applicant: Aktiebolaget SKF, Gothenburg (SE)

(72) Inventors: Kaihuan Zhang, Hangzhou (CN); Gang Cheng, Shanghai (CN)

(73) Assignee: Aktiebolaget SKF, Gothenburg (SE)

( * ) Notice: Subject to any disclaimer, the term of this patent is extended or adjusted under 35 U.S.C. 154(b) by 17 days.

(21) Appl. No.: 17/527,213

(22) Filed: Nov. 16, 2021

(65) Prior Publication Data

US 2022/0179394 A1    Jun. 9, 2022

(30) Foreign Application Priority Data

Dec. 9, 2020   (CN) .......................... 202011447664.4

(51) Int. Cl.
*G05B 19/4065* (2006.01)

(52) U.S. Cl.
CPC ..... *G05B 19/4065* (2013.01); *G05B 2219/32422* (2013.01); *G05B 2219/34465* (2013.01)

(58) Field of Classification Search
None
See application file for complete search history.

(56) References Cited

U.S. PATENT DOCUMENTS

2020/0027040 A1* 1/2020 Yuan .................. G06F 30/20

FOREIGN PATENT DOCUMENTS

| CN | 102478825 A | 5/2012 |
|---|---|---|
| CN | 103235555 A | 8/2013 |
| CN | 103869775 A | 6/2014 |
| CN | 104423324 A | 3/2015 |
| CN | 105974886 A | 9/2016 |
| CN | 107168244 A | 9/2017 |
| CN | 107530829 A | 1/2018 |
| CN | 107861473 A | 3/2018 |
| CN | 108196514 A | 6/2018 |
| CN | 108875281 A | 11/2018 |
| CN | 108921308 A | 11/2018 |
| CN | 109531266 A | 3/2019 |
| CN | 110023858 A | 7/2019 |
| CN | 108490880 B | 1/2020 |
| CN | 110806723 A | 2/2020 |
| CN | 110961986 A | 4/2020 |

\* cited by examiner

*Primary Examiner* — Ryan A Jarrett
(74) *Attorney, Agent, or Firm* — Garcia-Zamor Intellectual Property Law, LLC; Ruy Garcia-Zamor

(57) ABSTRACT

A machine tool management method, a machine tool management system and a medium are disclosed, the machine tool management method including: determining at least one target component of a machine tool; generating an evaluation result of the machine tool according to a preset processing rule based on the determined at least one target component; for each target component of one or more target components in the at least one target component, acquiring a target evaluation result corresponding to the target component from the evaluation result of the machine tool; determining a preset management rule based on the target evaluation result and type information and attribute information of the target component, and managing the target component according to the preset management rule.

12 Claims, 12 Drawing Sheets

S1024

S1025

MACHINE TOOL MANAGEMENT METHOD, MACHINE TOOL MANAGEMENT SYSTEM AND MEDIUM

This application claims priority to Chinese Patent Application no. 202011447664.4, filed Dec. 9, 2020, the contents of which is fully incorporated herein by reference.

TECHNICAL FIELD

The present invention relates to a field of machining, and more specifically to a machine tool management method, a machine tool management system and a medium.

BACKGROUND

With the wide application of machining in civil and commercial fields, higher requirements are also put forward for machining tools, especially machine tools.

At present, management of a machine tool (such as health management) is carried out by regular inspections and planned maintenance, and in most cases is carried out manually. However, such management method is inflexible, on-site, and based on experience, which leads to lag and uncertainty in management of the machine tool, key components within the machine tool, and even processing process. Although currently there are some management methods based on status monitoring, these methods only monitor an overall operating trend of the machine tool, only extract a single type of signals and a single type of features of the machine tool, and realize analysis, evaluation and management by using a single analysis method or based on a single variable in the features, which are difficult to reflect a true state, performance and change law of the machine tool, and are difficult to adapt to various flexible machine tools and processing conditions, resulting in poor accuracy and robustness of the machine tool management and failing to realize management and control of various aspects of the machine tool timely and effectively.

Therefore, there is a need for a machine tool management method based on a comprehensive evaluation of the machine tool on multiple levels, which can be well adapted to various flexible machine tool processing conditions under the premise of achieving good machine tool management, and the machine tool management method has high accuracy and robustness.

SUMMARY OF THE DISCLOSURE

In view of the above problems, the present invention provides a machine tool management method, a machine tool management system and a medium. The machine tool management method provided by the present invention can be well adapted to various flexible machine tool processing conditions on the basis of achieving good evaluation of machine tool statuses (e.g., machine tool health), comprehensively manage machine tools on multiple levels, and has high accuracy and robustness in management process of machine tools.

According to an aspect of the present invention, a machine tool management method is provided, comprising: determining at least one target component of a machine tool; generating an evaluation result of the machine tool according to a preset processing rule based on the determined at least one target component; for each target component of one or more target components in the at least one target component, acquiring a target evaluation result corresponding to the target component from the evaluation result of the machine tool; determining a preset management rule based on the target evaluation result and type information and attribute information of the target component, and managing the target component according to the preset management rule.

In some embodiments, generating the evaluation result of the machine tool according to the preset processing rule based on the determined at least one target component comprises: for each target component: acquiring the type information and the attribute information of the target component; determining and acquiring target working condition data, target status monitoring data, and target design parameter data corresponding to the target component based on the acquired type information and attribute information; generating an original data set based on the target working condition data, the target status monitoring data and the target design parameter data; preprocessing the original data set based on a target preprocessing rule matching the type information and the attribute information of the target component, to obtain a target data set; performing feature extraction on the target data set based on a target feature extraction rule matching the type information and the attribute information of the target component, to obtain a feature data set; performing multi-level evaluation of the target component based on a multi-level evaluation rule matching the type information and the attribute information of the target component and the feature data set of the target component, to generate an evaluation result of the target component; generating the evaluation result of the machine tool based on the evaluation result of the at least one target component.

In some embodiments, the preset management rule corresponds to a target monitoring rule of the target component and managing the target component according to the preset management rule comprises: implementing status monitoring and abnormality detection of the target component based on the target monitoring rule.

In some embodiments, the preset management rule corresponds to a health management rule of the target component and managing the target component according to the preset management rule comprises: implementing health management of the target component based on the health management rule.

In some embodiments, the preset management rule includes a maintenance and optimization strategy corresponding to the target component and managing the target component according to the preset management rule comprises: implementing maintenance and optimization of the target component based on the maintenance and optimization strategy.

In some embodiments, for each target component, generating the original data set based on the target working condition data, the target status monitoring data and the target design parameter data comprises: performing synchronous processing in multiple dimensions on the target working condition data, the target status monitoring data, and the target design parameter data, to obtain the original data set; the multiple dimensions including a space dimension and a time dimension.

In some embodiments, for each target component, preprocessing the original data set based on the target preprocessing rule to obtain the target data set comprises: determining a data division rule corresponding to the original data set based on the target working condition data in the original data set; performing data division on the original data set based on the data division rule to obtain the target data set.

In some embodiments, for each target component, performing feature extraction on the target data set based on the target feature extraction rule to obtain the feature data set comprises: extracting features of the target working condition data in the target data set to obtain working condition features of the target data set; extracting features of the target status monitoring data in the target data set to obtain status monitoring features of the target data set; extracting features of the target design parameter data in the target data set to obtain design parameter features of the target data set; obtaining the feature data set of the target component based on the working condition features, the status monitoring features, and the design parameter features.

In some embodiments, for each target component, performing multi-level evaluation of the target component based on the multi-level evaluation rule and the feature data set of the target component to generate an evaluation result of the target component comprises: performing multi-level evaluation of the target component in terms of working conditions, monitoring statuses, and design parameters, respectively, based on the feature data set of the target component to obtain evaluation data; and generating an overall evaluation data of the target component based on the evaluation data.

In some embodiments, the target component includes a cutter of the machine tool, and management of the cutter includes at least one of execution threshold setting of at least one sub-process of the cutter, detection threshold setting of the cutter, and useful life model establishment of the cutter.

According to another aspect of the present disclosure, a machine tool management system is also provided, comprising: a target component determination module configured to determine at least one target component of a machine tool; an evaluation result acquisition module configured to generate an evaluation result of the machine tool according to a preset processing rule based on the determined at least one target component; a target evaluation result generation module configured to, for each target component of one or more target components in the at least one target component, acquire a target evaluation result corresponding to the target component from the evaluation result of the machine tool; a machine tool management module configured to, for each target component of one or more target components in the at least one target component, determine a preset management rule based on the target evaluation result and type information and attribute information of the target component, and manage the target component according to the preset management rule.

According to another aspect of the present disclosure, a computer-readable storage medium is also provided, characterized in that computer-readable instructions are stored thereon, and when the instructions are executed by a computer, the method as described above is performed.

BRIEF DESCRIPTION OF THE DRAWINGS

In order to illustrate technical solutions of embodiments of the present invention more clearly, accompanying drawings required to use in description of the embodiments will be briefly introduced below. Obviously, the accompanying drawings in the following description are only some embodiments of the present invention, and for those of ordinary skill in the art, other drawings may be obtained based on these drawings without creative work. The following drawings are not deliberately scaled and drawn in proportion to actual sizes, and the focus is to show the gist of the present invention.

DESCRIPTION OF THE EMBODIMENTS

Figure 1:
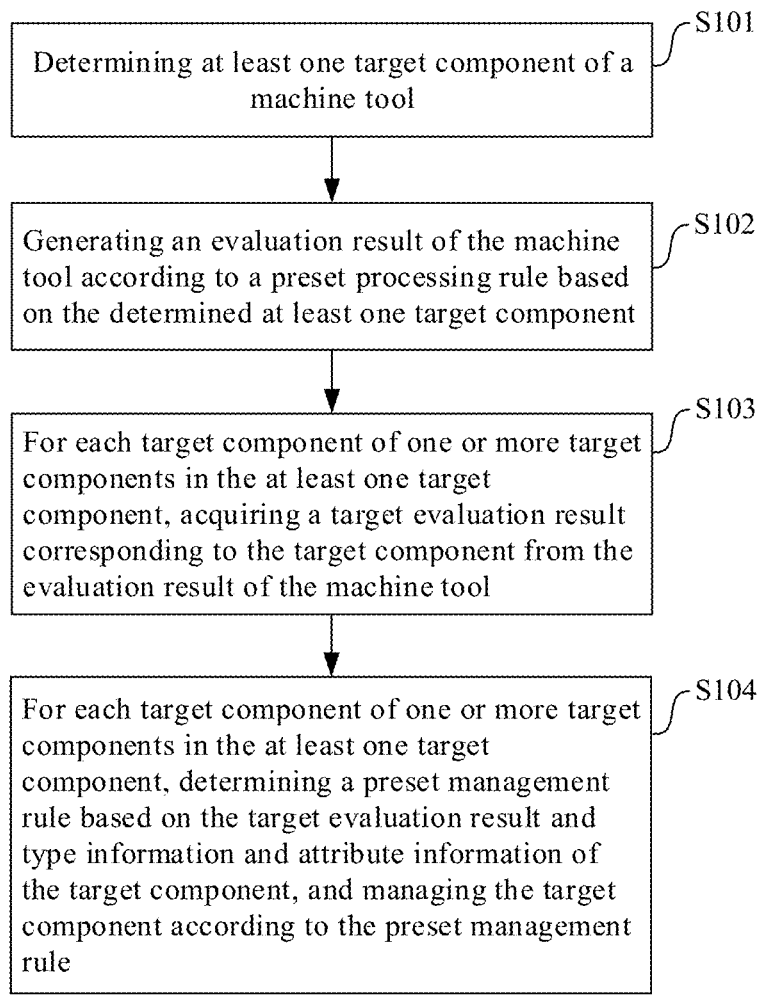
FIG. 1 shows an exemplary flowchart of a machine tool management method 100 according to some embodiments of the present disclosure.

The technical solutions in the embodiments of the present invention will be clearly and thoroughly described below in conjunction with the accompanying drawings. Obviously, the described embodiments are only part of, rather than all of, the embodiments of the present invention. Based on the embodiments of the present invention, all other embodiments obtained by those of ordinary skill in the art without creative work also fall within the scope of the present invention.

As shown in the present application and claims, the words "a", "an", "one" and/or "the" do not specifically refer to the singular, but may also include the plural, unless exceptions are explicitly stated in the context. Generally, the terms "comprising" and "including" only suggest that those clearly identified steps and elements are included, these steps and elements do not constitute an exclusive list, and a method or device may also include other steps or elements.

Although this application makes various references to certain modules in a system according to the embodiments of the application, any number of different modules may be used and run on user terminals and/or servers. The modules are merely illustrative, and different modules may be used for different aspects of the system and method.

In this application, flowcharts are used to illustrate operations performed by a system according to the embodiments of the application. It should be understood that the preceding or following operations are not necessarily performed exactly in order. Rather, various steps may be processed in reverse order or simultaneously as required. At the same time, other operations may be added to these processes, or a certain step or steps of operations may be removed from these processes.

It should be understood that a machine tool described in this application is intended to characterize a machine used to manufacture machines, that is, a machine for manufacturing or a tool machine. The machine tool may be, for example, a cutting machine tool, a forging machine tool, a woodworking machine tool, or the like. A specific type of the machine tool may be selected according to an actual machining method and actual needs, for example. The embodiments of the present disclosure are not limited by the specific type and composition of the machine tool.

At present, management of a machine tool (such as health management) is carried out by regular inspections and planned maintenance, and in most cases is carried out manually. However, such management method is inflexible, on-site, and based on experience, which leads to lag and uncertainty in management of the machine tool, key components within the machine tool, and even processing process. Although currently there are some management methods based on status monitoring, these methods only monitor an overall operating trend of the machine tool, only extract a single type of signals and a single type of features of the machine tool, and realize analysis, evaluation and management by using a single analysis method or based on a single variable in the features, which are difficult to reflect a true state, performance and change law of the machine tool, and are difficult to adapt to various flexible machine tools and processing conditions, resulting in poor accuracy and robustness of the machine tool management and failing to realize management and control of various aspects of the machine tool timely and effectively.

On this basis, this application provides a machine tool management method, a machine tool management system and a medium, which can be well adapted to various flexible machine tool processing conditions under the premise of achieving good machine tool management, and machine tool management method is a machine tool management method based on a comprehensive evaluation of the machine tool on multiple levels, and the machine tool management method has high accuracy and robustness.

FIG. 1 shows an exemplary flowchart of a machine tool management method 100 according to an embodiment of the present disclosure.

Referring to FIG. 1, first, in step S101, at least one target component of a machine tool is determined.

The target component is intended to characterize a core component of the machine tool that is concerned in the current machine tool evaluation. The target component may be selected based on actual needs, for example, a cutter of the machine tool may be determined as the target component, or other components of the machine tool may also be determined as the target component. The embodiments of the present disclosure are not limited by the determination method of the machine tool and the specific determined component of the machine tool.

In step S102, an evaluation result of the machine tool is generated according to a preset processing rule based on the determined at least one target component.

The preset processing rule is, for example, a processing rule that is set in advance, or may also be a processing rule selected by a user based on actual needs. The embodiments of the present disclosure are not limited by the specific composition of the preset processing rule.

The evaluation result of the machine tool is intended to characterize evaluation information obtained by evaluating the machine tool. For example, it may be an evaluation data value, or it may be a waveform or a graph, or a data evaluation model. The embodiments of the present disclosure are not limited by the specific composition and type of the evaluation result.

For example, the evaluation result of the machine tool may be generated based on an evaluation result of the at least one target component or may also be obtained by combining evaluation results of target components and other attribute information of the machine tool. It should be understood that the embodiments of the present disclosure are not limited by the specific way of generating the evaluation result of the machine tool.

Thereafter, in step S103, for each target component of one or more target components in the at least one target component, a target evaluation result corresponding to the target component is acquired from the evaluation result of the machine tool.

The target evaluation result corresponding to the target component is intended to characterize information content associated with the target component in the evaluation result of the machine tool. For example, the evaluation result of the machine tool corresponding to the target component may include data directly representing a status, performance, and design parameters of the target component in the evaluation result of the machine tool and may also include some measurement parameters or signal data that indirectly reflect working performance of the target component. The embodiments of the present disclosure are not limited by the specific composition of the target evaluation result corresponding to the target component.

Further, in step S104, for each target component of one or more target components in the at least one target component, a preset management rule is determined based on the target evaluation result and type information and attribute information of the target component, and the target component is managed according to the preset management rule.

The type information is intended to characterize a category of the target component, which may include, for example, a motor category, a cutter category, a control component category, and the like. The embodiments of the present disclosure are not limited by the specific composition of the type information.

The attribute information is information that characterizes an attribute status of the target component. For example, the attribute information includes, for example, setting or demand information input by the user (e.g., for a cutter, the number of continuous working hours of the cutter or the number of sub-processes that the cutter needs to execute set by the user), or it may also be condition information set based on actual use, for example, an emergency stop fault, or an over-temperature fault attribute set for a lathe motor.

The embodiments of the present disclosure are not limited by the specific composition of the attribute information.

For example, the process of determining the preset management rule based on the target evaluation result corresponding to the target component, the type information and attribute information of the target component may be described in more detail. For example, the target evaluation result, the type information, and the attribute information may be comprehensively processed based on a preset algorithm, to output the preset management rule of the target component. The embodiments of the present disclosure are not limited by the way of generating the preset management rule.

The preset management rule is intended to characterize rule requirements that limit the specific flow steps of management of the target component, which may include, for example, a monitoring management rule, a status monitoring and status alarm rule, an abnormality detection and abnormality handling rule, a maintenance and optimization rule and the like. The embodiments of the present disclosure are not limited by the specific composition of the preset management rule.

Based on the above, in this application, by determining at least one target component of the machine tool, generating the evaluation result of the machine tool based on the target component, acquiring the target evaluation result corresponding to the target component from the evaluation result of the machine tool, and synthesizing the target evaluation result, the type information and attribute information of the target component to determine the preset management rule to realize management of the target component, in the process of managing target components of the machine tool, preset management rules suitable for the target components may be well determined based on current evaluation results of different target components and the target components' own characteristics (type information), actual application scenarios and requirements (attribute information) to realize management of the target components, thereby realizing flexible management of the target components and improving robustness and accuracy in the management of the machine tool.

Figure 2:
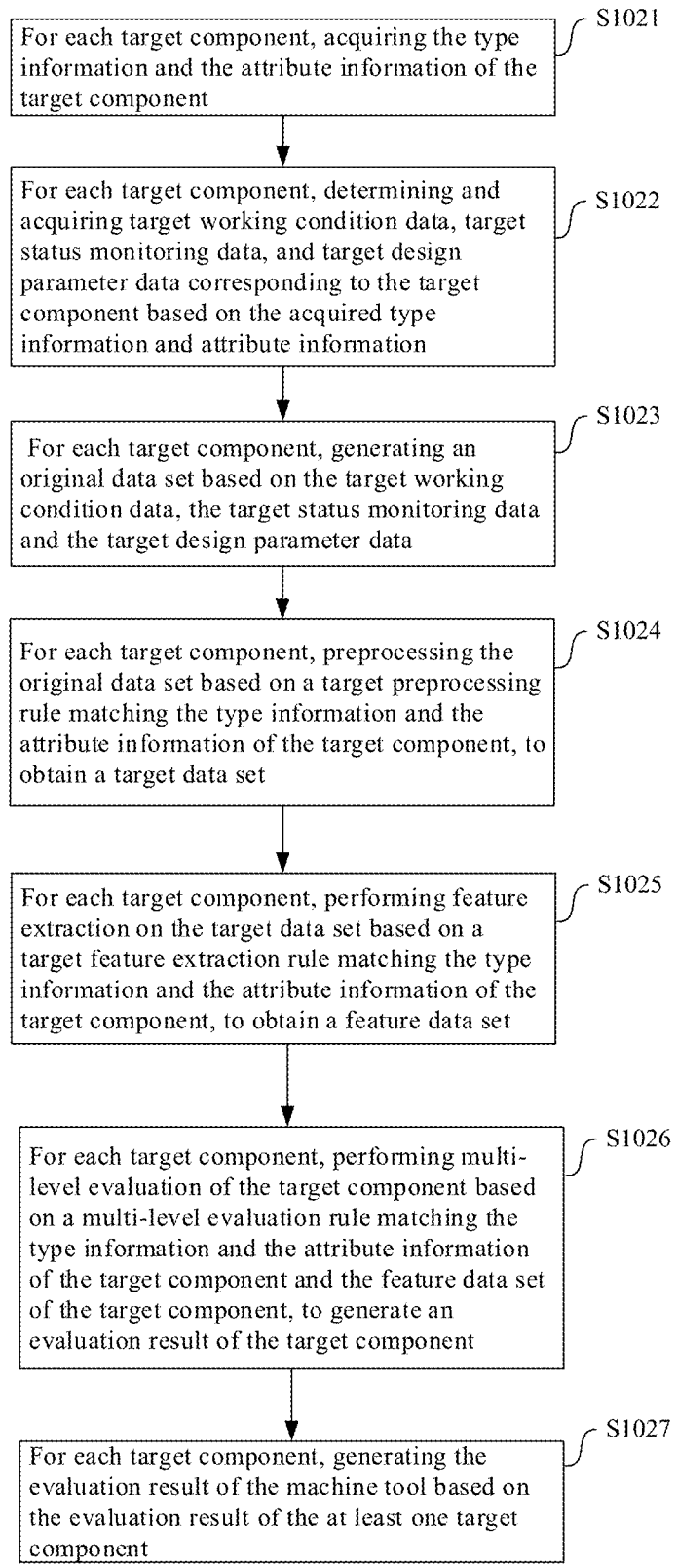
FIG. 2 shows an exemplary flowchart of a process S102 of generating a machine tool evaluation result according to some embodiments of the present disclosure.

In some embodiments, the process S102 of generating the evaluation result of the machine tool according to the preset processing rule based on the determined at least one target component may be described in more detail, for example. FIG. 2 shows an exemplary flowchart of the process S102 of generating the evaluation result of the machine tool according to an embodiment of the present disclosure.

Referring to FIG. 2, first, in step S1021, for each target component, the type information and attribute information of the target component are acquired.

As described above, the type information is intended to characterize a category of the target component, which may include, for example, a motor category, a cutter category, a control component category, and the like. The embodiments of the present disclosure are not limited by the specific composition of the type information. The attribute information is information that characterizes an attribute status of the target component. The embodiments of the present disclosure are not limited by the specific composition of the attribute information.

It should be noted that after a target component in step S1021 is determined, step S1022 and subsequent corresponding steps may be executed for the target component.

Thereafter, in step S1022, for each target component, target working condition data, target status monitoring data, and target design parameter data corresponding to the target component are determined and acquired based on the acquired type information and attribute information.

It should be understood that the data here (the target working condition data, the target status monitoring data, and the target design parameter data) may be, for example, analog data, such as directly acquired torque values; or may also be digital data, such as voltage and current signal values. The embodiments of the present disclosure are not limited by the data type of the data.

The target working condition data is data used to reflect an overall working status of the machine tool, and the target working condition data is associated with the target component and may be used to reflect a working status of the target component. The corresponding target working condition data may include, for example, a timestamp, a program name, a tool number, current machine tool coordinates, remaining machining coordinates, a machine tool spindle speed, a machine tool spindle temperature, and the like, depending on the determined different target component. The embodiments of the present disclosure are not limited by the specific composition and type of the target working condition data.

The target status monitoring data is monitoring data obtained by monitoring the target component or a specific processing procedure of the target component, and the monitoring data may directly or indirectly reflect part of working processes of the target component or an overall status of the target component. For example, the monitoring data may include machine tool spindle current, machine tool spindle load, machine tool spindle power, machine tool spindle vibration situation, machine tool cutting force, lubrication flow, lubrication pressure, oil pollution and the like, depending on actual needs and the determined target component. The embodiments of the present disclosure are not limited by the specific type and composition of the status monitoring data.

The target design parameter data is a parameter used to characterize setting information within the machine tool associated with the target component. It includes, for example, life setting data of the machine tool spindle, life setting data of the machine bearing, life setting data of the grease, setting data of the machine layout type, setting data of the maximum speed of the machine tool, setting stiffness, assembly data and the like, depending on the selected different target component. The embodiments of the present disclosure are not limited by the specific type and composition of the target design parameter data.

The process of determining the target working condition data, the target status monitoring data, and the target design parameter data corresponding to the target component based on the type information and the attribute information may be described in more detail, for example. For example, conventional target data (e.g., including conventional working condition data, conventional status monitoring data, and conventional design parameter data) corresponding to the type information may be acquired based on the type information and a conventional target data correspondence table; then, additional target data (e.g., including additional working condition data, additional status monitoring data, and additional design parameter data) corresponding to the attribute information may also be acquired based on the attribute information and an additional target data correspondence table, thereby determining the target working condition data, the target status monitoring data, and the target design parameter data corresponding to the target component.

However, it should be understood that the foregoing only provides an exemplary method for determining the target working condition data, the target status monitoring data, and the target design parameter data of the machine tool. The target working condition data, the target status monitoring data, and the target design parameter data corresponding to the target component may also be determined based on actual needs of the user, or the target working condition data, the target status monitoring data, and the target design parameter data corresponding to the target component may also be configured according to actual use scenarios of the machine tool. The embodiments of the present disclosure are not limited by the specific manner of determining the target working condition data, the target status monitoring data, and the target design parameter data of the target component.

For example, the process of acquiring the target working condition data, the target status monitoring data, and the target design parameter data may be described in more detail, for example. For example, the target working condition data of the target component may be directly sampled from a control system of the machine tool or a working system of the machine tool according to a predetermined sampling frequency, or the target working condition data may also be acquired from other sources. The embodiments of the present disclosure are not limited by the specific source of the target working condition data and the acquisition method thereof.

For example, the target status monitoring data corresponding to the target component may be acquired from sensors arranged inside or around the machine tool according to a predetermined sampling frequency or may also be acquired in other ways. The embodiments of the present disclosure are not limited by the specific source of the target status monitoring data and the acquisition method thereof.

For example, the target design parameter data of the target component may be collected from the system according to a predetermined sampling frequency, or the corresponding target design parameter data may also be manually collected according to actual needs. The embodiments of the present disclosure are not limited by the specific source of the target design parameter data and the acquisition method thereof.

Thereafter, in step S1023, for each target component, an original data set is generated based on the target working condition data, the target status monitoring data, and the target design parameter data.

For example, the foregoing process of generating the original data set based on the target working condition data, the target status monitoring data, and the target design parameter data may be described in more detail, for example. For example, the original data set may be generated by directly utilizing the acquired target working condition data, target status monitoring data, and target design parameter data, or the target working condition data, the target status monitoring data, and the target design parameter data may be processed based on a preset algorithm or processing rule, and the original data set may be generated based on the processing result. The embodiments of the present disclosure are not limited by the specific composition way of the original data set.

After obtaining the original data set, in step S1024, for each target component, the original data set is preprocessed based on a target preprocessing rule matching the type information and the attribute information of the target component to obtain a target data set.

The preprocessing process is intended to characterize a process of processing data to filter out valid data currently needed, reducing and suppressing invalid data, and improving data quality. A data set required for current machine tool estimation obtained after preprocessing the original data set is the target data set.

The preprocessing rule is intended to characterize rule requirements that limit specific flow steps included in the preprocessing process.

The target preprocessing rule is a preprocessing rule of the target component determined based on the type information and the attribute information of the target component. For example, the target preprocessing rule corresponding to the target component may be directly generated by a preset algorithm or rule based on the type information and the attribute information of the target component. Alternatively, a preprocessing rule corresponding to different data in the original data set may also be determined based on comprehensive processing of the original data set, the type information, and the attribute information of the target component utilizing a preset algorithm. It is also possible to determine or select, based on the type information and the attribute information of the target component, a matching target preprocessing rule from a plurality of candidate preprocessing rules by the user himself/herself based on actual needs. The embodiments of the present disclosure are not limited by the way of acquiring the matching target preprocessing rule and the specific content of the target preprocessing rule.

Based on the target data set, in step S1025, for each target component, feature extraction is performed on the target data set based on a target feature extraction rule matching the type information and the attribute information of the target component to obtain a feature data set.

The feature extraction is intended to characterize a process of extracting features of at least a part of data in the target data set of the target component. The feature extraction rule is intended to characterize rule requirements that limit specific flow steps included in the feature extraction process.

The target feature extraction rule is intended to characterize a feature extraction rule of the target component determined based on the type information and the attribute information of the target component. For example, the feature extraction rule corresponding to the target component may be generated directly by a preset algorithm or rule based on the type information and the attribute information of the target component. Or, other methods may be used to determine the target feature extraction rule. The embodiments of the present disclosure are not limited by the specific determination method of the target extraction rule of the target component.

Depending on actual needs, the target feature extraction rule may include, for example, adopting multiple different feature extraction methods for data in the target data set, to obtain features of the data in multiple aspects such as the time domain, frequency domain, morphology, fusion and the like. The embodiments of the present disclosure are not limited by the specific composition of the target feature extraction rule.

The feature data set is intended to characterize a data set obtained based on feature data obtained after feature extraction processing is performed on the data in the target data set. The embodiments of the present disclosure are not limited by the specific composition of the obtained feature data set.

After the feature data set is obtained, in step S1026, for each target component, multi-level evaluation of the target component is performed based on a multi-level evaluation rule matching the type information and the attribute information of the target component and the feature data set of the target component, to generate the evaluation result of the target component.

The multi-level evaluation is intended to characterize evaluation of the target component at different levels, for example, including execution at multiple different levels such as a working condition level, a status monitoring level, a design parameter level and the like. For example, for a cutter component, the multi-level evaluation may include, for example, evaluating the target component at a sub-process performance level of the component and an overall performance level of the component.

The multi-level evaluation rule is intended to characterize rule requirements of specific flow steps of the multi-level evaluation. The multi-level evaluation rule matching the type information and the attribute information of the target component is intended to characterize a multi-level evaluation rule corresponding to the target component determined based on the type information and the attribute information of the target component. For example, the target multi-level evaluation rule corresponding to the target component may be generated directly by a preset algorithm or rule based on the type information and the attribute information of the target component. Or, other methods may be used to determine the target multi-level evaluation rule. The embodiments of the present disclosure are not limited by the specific determination method of the target multi-level evaluation rule of the target component.

The evaluation result of the target component is intended to characterize evaluation information obtained after multi-level evaluation of the target component. For example, it may be an evaluation data value, or it may be a waveform or graph, or a data evaluation model. The embodiments of the present disclosure are not limited by the specific composition and type of the evaluation result.

Thereafter, in step S1027, the evaluation result of the machine tool is generated based on the evaluation result of the at least one target component.

The evaluation result of the machine tool is intended to characterize evaluation information obtained by evaluating the machine tool. As described above, the embodiments of the present disclosure are not limited by the specific composition and type of the evaluation result.

The process of generating the evaluation result of the machine tool based on the evaluation result of the at least one target component may be described in more detail, for example. For example, in the process of generating the evaluation result of the machine tool, for example, the evaluation result of the target component may be combined with evaluation results of the machine tool at multiple other levels, so as to comprehensively evaluate the machine tool at different levels, that is, multi-level evaluation of the machine tool. For example, the evaluation result of the machine tool may be generated by integrating results of the machine tool at multiple different levels such as signal evaluation, feature evaluation, technical process evaluation, target component evaluation and the like. Moreover, the various evaluation processes may be combined with each other, and evaluation means may be flexibly selected according to the structure of the machine tool and actual needs.

However, it should be understood that the forgoing only provides an exemplary machine tool evaluation method. Depending on actual needs, other evaluation methods may also be used, or this method may be combined with other evaluation methods. The embodiments of the present disclosure are not limited by the specific evaluation method adopted.

For example, when performing health evaluation of the machine tool, evaluation parameters used to calculate, characterize and evaluate a health condition of the machine tool may include, for example, an average value, a weighted average value, a median value, a maximum value, a minimum value, an area and even a compound index that can reflect a health degree of the machine tool. The embodiments of the present disclosure are not limited by the type of the evaluation parameters selected in the evaluation process.

Based on the foregoing, in this application, at least one target component of the machine tool is determined; the target working condition data, the target status monitoring data, and the target design parameter data of the target component are determined and acquired based on the type information and the attribute information of the target component, preprocessing and feature extraction are performed on the various data to obtain the feature data set; and, based on the feature data set, multi-level evaluation of the target component is performed to generate the evaluation result of the target component, and accordingly generate the evaluation result of the machine tool. Compared with the technical solution of collecting a single type of signals and performing a single type of analysis and evaluation in the prior art, in this application, on the one hand, various types of data related to the target component in the machine tool are collected, the overall working status, partial processes and component working status and parameter design of each target component of the machine tool are comprehensively considered, thereby enabling to reflect the status of the target component more comprehensively and more accurately, so as to better reflect the status of the machine tool; on the other hand, evaluation of the target component and the machine tool are achieved by adopting a multi-level evaluation method, so that a variety of different analysis methods may be applied on the basis of obtaining multiple categories, realizing evaluation of the performance status of the machine tool from multiple angles and multiple aspects, and enabling the evaluation result to reflect the actual performance status and change law of the machine tool, thereby providing more accurate and timely evaluation results of the machine tool. It is conducive to further monitoring, feedback and optimization based on the evaluation results, so as to achieve a good management process of the machine tool.

In some embodiments, the process of generating the original data set based on the target working condition data, the target status monitoring data, and the target design parameter data for each target component in the above step S1023 may be described in more detail, for example. For example, synchronous processing in multiple dimensions may be performed on the target working condition data, the target status monitoring data, and the target design parameter data to obtain the original data set.

For example, the multiple dimensions include a space dimension and a time dimension. Specifically, for example, when the target working condition data, the target status monitoring data, and the target design parameter data are acquired by periodic sampling, due to a selected different sampling frequency and a different starting time of the sampling process, the acquired target working condition data, target status monitoring data, and target design parameter data, for example, have different starting points on the time axis, and their respective durations are different. It is also possible that part of the data is missing or significantly inaccurate due to an abnormality in the sampling process, so that data in the acquired original data set has incomplete data content in the spatial dimension, and discontinuous data and inconsistent timing in the time dimension. At this time, for example, the data may be processed in the time dimension based on a standard clock source to achieve synchronization and alignment between multi-source data, while various algorithms such as interpolation algorithms and conversion algorithms may also be used to modify and complete data values (i.e., processing in the spatial dimension) to obtain a complete original data set for monitoring and evaluation of the machine tool.

On this basis, by performing synchronous processing on multi-source data in multiple dimensions such as time, space and the like on the basis of acquiring the target working condition data, the target status monitoring data and the target design parameter data, synchronization and alignment of the multi-source data can be realized, and it is conducive to correct the problem of missing data content, thereby further improving quality of data in the acquired original data set, facilitating subsequent processing and evaluation based on the data, as well as improving reliability and accuracy of the evaluation and management of the machine tool.

Figure 3:
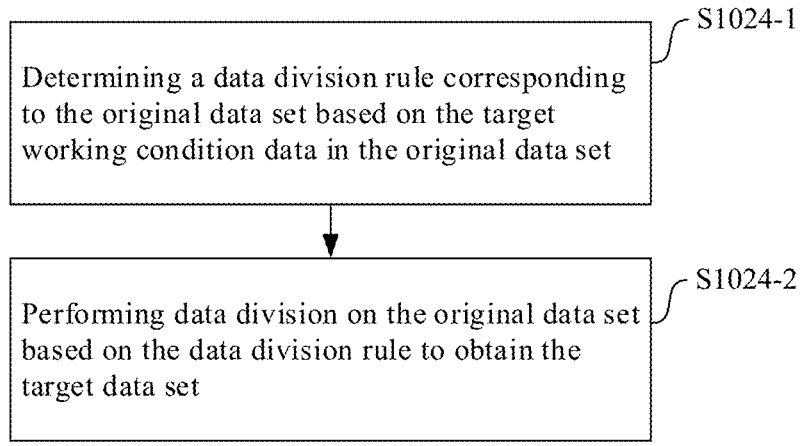
FIG. 3 shows an exemplary flowchart of a process S1024 of preprocessing an original data set to obtain a target data set according to some embodiments of the present disclosure.

In some embodiments, the foregoing step S1024 of preprocessing the original data set to obtain the target data set may be described in more detail, for example. FIG. 3 shows an exemplary flowchart of the process S1024 of preprocessing the original data set to obtain the target data set according to some embodiments of the present disclosure.

Referring to FIG. 3, first, in step S1024-1, a data division rule corresponding to the original data set is determined based on the target working condition data in the original data set.

The data division rule is intended to characterize a rule for data division and grouping of data in the original data set. The data division rule may be, for example, directly determined based on the target working condition data, or may also be determined by processing the target working condition data using a preset algorithm. The present disclosure is not limited by the specific determination method of the data division rule.

Depending on actual needs, the data division rule may be, for example, cutting tool-based division, process mode-based division, machining process-based division and the like. The embodiments of the present disclosure are not limited by the specific content of the data division rule.

Thereafter, in step S1024-2, data division is performed on the original data set to obtain the target data set based on the data division rule.

The data division is intended to characterize an operation of grouping or segmenting data in the target data set. Specifically, for example, multiple data in the target data set may be divided into a same group, or the data in the data set may be intercepted and segmented first, and then the intercepted data may be grouped. The embodiments of the present disclosure are not limited by the specific execution manner of the data division process.

It should be understood that, depending on actual needs, for example, only one target data set may be generated, or a plurality of target data sets may also be generated (e.g., respectively corresponding to a plurality of different technical processes or different sub-components of the target component). The embodiments of the present disclosure are not limited by the specific number of target data sets obtain For example, if the current cutter component of the machine tool performs a "turning" process, and the technical process includes: feeding the cutter—turning—retreating the cutter. If the target working condition data (e.g., timestamp data and working process data), torque data of the machine tool spindle (status monitoring data) and spindle life data of the machine tool (target design parameter data) of the cutter component during the whole technical process are currently acquired. When only the turning stage needs to be evaluated, for example, a different working stages (a cutter feeding stage, a turning stage, and a cutter retreating stage) may be determined according to the working process data of the target working condition data, and grouping according to the working stage is performed to extract the spindle life data corresponding to the turning stage, the target working condition data corresponding to the turning stage, and the spindle torque data corresponding to the turning stage, and generate the target data set.

Based on the above, the data division rule is determined based on the target working condition data in the original data set, and data in the data set is divided. Therefore, depending on actual needs and a specific evaluation object, a data set associated with the current specific evaluation object (e.g., a specific technical process of the target component, a specific sub-component of the target component, etc.) can be obtained, so as to obtain a simplified data set with the minimum granularity required for subsequent evaluation, which is conducive to improving the speed and efficiency of subsequent processing and evaluation; at the same time, based on the data division, extracted multi-source data is organically combined based on preset rules to obtain multi-level, multi-angle status data corresponding to the specific evaluation object, which is conducive to realize subsequent accurate and dynamic evaluation of the specific evaluation object based on the data, so as to realize reliable and high-precision evaluation and management of the machine tool.

In some embodiments, for example, the data division rule of the original data set may be determined commonly based on the target working condition data, the target status monitoring data, and the target design parameter data, or the data division rule of the original data set may also be determined based on a part of the target working condition data, the target status monitoring data, and the target design parameter data.

In some embodiments, in the above-mentioned preprocessing process, before or after the data division process, it may further include, for example, a data de-duplication process, a data noise reduction process, a data encoding process, and a data filtering process.

The data de-duplication process is intended to delete duplicate data in the target data set. For example, duplicate data may be retrieved and deleted based on data such as timestamp, process number and the like.

The data noise reduction process is intended to remove abnormal values in the data and realize optimization of the data. For example, distance-based detection, statistics-based detection, distribution-based outlier detection, density clustering detection, boxplot detection and the like may be used to perform noise reduction on the original signal data to remove abnormal values in the data.

The data encoding is intended to characterize a process of processing the data format based on a preset rule to obtain uniformly encoded data. For example, a required target data format may be determined according to analysis, modeling, and evaluation, and the data may be encoded accordingly based on the target data format to facilitate subsequent processing.

The data filtering is intended to identify and eliminate noise in the data, and improve a contrast of effective feature information in the data. For example, a weighted average filter, a median filter, a Gaussian filter, a Wiener filter, and the like may be used to implement the data process.

It should be understood that the foregoing only provides an exemplary preprocessing process. Other preprocessing methods may also be selected depending on actual needs.

Figure 4:
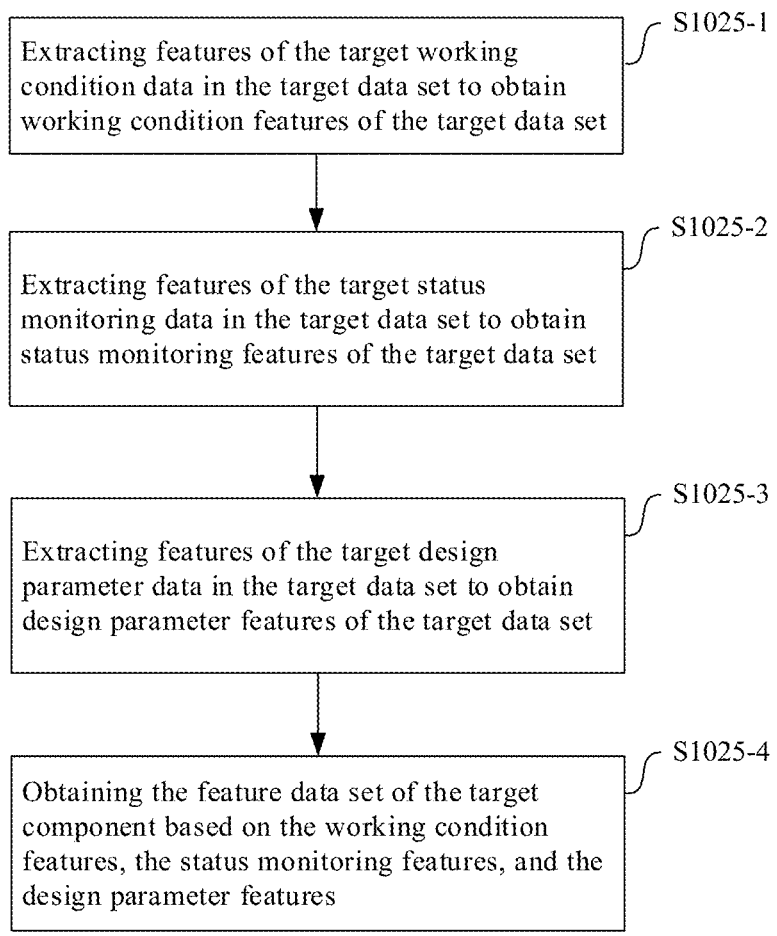
FIG. 4 shows an exemplary flowchart of a process S1025 of obtaining a feature data set of the machine tool according to some embodiments of the present disclosure.

In some embodiments, for each target component, the process S1025 of performing feature extraction on the target data set based on the target feature extraction rule to obtain the feature data set may be described in more detail, for example. FIG. 4 shows an exemplary flowchart of the process S1025 of obtaining the feature data set of the machine tool according to some embodiments of the present disclosure.

Referring to FIG. 4, first, in step S1025-1, features of the target working condition data in the target data set are extracted to obtain working condition features of the target data set. Then, in step S1025-2, features of the target status monitoring data in the target data set are extracted to obtain status monitoring features of the target data set. Thereafter, further, in step S1025-3, features of the target design parameter data in the target data set are extracted to obtain design parameter features of the target data set.

It should be understood that, when feature extraction is performed on the target working condition data, the target status monitoring data, and the target design parameter data, for example, different feature extraction methods may be utilized to extract different types of data features, according to types and characteristics of specific data values included in the target working condition data, the target status monitoring data, and the target design parameter data, respectively. The embodiments of the present disclosure are not limited by the specific manner of the feature extraction.

It should be understood that, in steps S1025-1, S1025-2, and S1025-3, for example, a same feature extraction method may be used, or different feature extraction methods may also be used. The embodiments of the present disclosure are not limited by the relationship of the feature extraction methods adopted in steps S1025-1, S1025-2, and S1025-3.

It should be understood that the above steps S1025-1, S1025-2, and S1025-3 may be executed sequentially, or they may also be executed in reverse order or in parallel. The embodiments of the present disclosure are not limited by the execution order of the above steps S1025-1, S1025-2, and S1025-3.

A feature extraction method used when feature extraction is performed on the target working condition data, the target status monitoring data, and the target design parameter data will be exemplarily shown below. For example, depending on actual needs, the data extraction of the target data set may include, for example, time domain feature extraction, frequency feature extraction, time-frequency domain feature extraction, and waveform feature extraction.

The time domain feature extraction refers to extracting time domain features of data (e.g., collected signals), which includes, but is not limited to, a mean, a variance, a standard deviation, a maximum value, a minimum value, a root mean square, a peak-to-peak value, skewness, kurtosis, a waveform index, an impulse index, a margin index and the like.

The frequency feature extraction refers to extracting frequency features of data, which includes, but is not limited to, mean square frequency, frequency variance, frequency band energy, and the like.

The time-frequency domain feature extraction refers to extracting time-frequency domain features of data, including, but not limited to, frequency band energy or time domain characteristics of signals after wavelet decomposition or empirical mode decomposition.

The waveform feature extraction refers to extracting waveform features of data. For example, when the data is a collected signal, the waveform features include, but are not limited to, the area enclosed by the signal waveform, maximum/minimum derivative, rising edge and falling edge features, and the like.

Finally, in step S1025-4, the feature data set of the target component is obtained based on the working condition features, the status monitoring features, and the design parameter features.

For example, the feature data set may be formed directly using the working condition features, the status monitoring features, and the design parameter features. Or, further processing (e.g., feature fusion processing) may be performed on the working condition features, the status monitoring features, and the design parameter features, and the feature data set may be obtained based on the processing result. The embodiments of the present disclosure are not limited by the specific generation method and content of the feature data set.

Based on the above, in this application, by extracting the working condition features, the status monitoring features, and the design parameter features from the target data set using a variety of feature extraction methods depending on actual needs, and obtaining the feature data set of the machine tool based on the working condition features, the status monitoring features, and the design parameter features, the obtained feature data set can comprehensively reflect characteristics of the target component in terms of a plurality of aspects such as working conditions, status monitoring, and design parameters. Compared with the technical solution that only extracts a single feature and executes only a single feature extraction method, the feature data set obtained in this application can more comprehensively reflect multi-level, multi-dimensional, and multi-faceted characteristics of the target component, which is conducive to realize accurate and high-precision evaluation and management based on the feature data set subsequently.

In some embodiments, obtaining the feature data set of the target component based on the working condition features, the status monitoring features, and the design parameter features includes: obtaining fused feature data through feature fusion processing based on the working condition features, the status monitoring features, and the design parameter features, and generating the feature data set based on the fused feature data.

The data fusion processing is intended to characterize a process of fusing a plurality of features to obtain fused feature data based on a preset fusion rule.

For example, a feature layer deep fusion method may be used, that is, performing dimensionality reduction and fusion to extracted original features (e.g., the working condition features, the status monitoring features, and the design parameter features) based on distance algorithm, similarity algorithm, weighted average algorithm, principal component analysis algorithm and the like, and obtaining fused feature that integrates original feature information from the feature depth direction.

For example, a working status layer width fusion method may also be adopted, that is, for features of the original features corresponding to different sub-processes of a same overall process, the features may be integrated to obtain fused feature reflecting the overall process, which may be further integrated with actual business scenarios for subsequent evaluation.

It should be understood that only exemplary fusion methods are provided above, and different data fusion methods may be adopted depending on actual needs, for example, a signal layer width fusion method may also be adopted. The embodiments of the present disclosure are not limited by the specific manner of the data fusion.

Based on the above, by performing feature fusion after feature extraction, the extracted features can be further correlated in different dimensions, so that overall and comprehensive feature information can be obtained based on the local and scattered features, which is conducive to better reflect characteristics of various aspects of the target component, thereby facilitating subsequent evaluation of the target component at multiple levels, and improving accuracy of evaluation and management of the machine tool.

In some embodiments, for each target component, performing multi-level evaluation of the target component based on the multi-level evaluation rule and the feature data set of the target component to generate the evaluation result of the target component includes: performing multi-level evaluation of the target component in terms of working conditions, monitoring statuses, and design parameters, respectively, based on the feature data set of the target component to obtain evaluation data; and generating an overall evaluation data of the target component based on the evaluation data.

The evaluation of the target component in terms of working conditions is working condition evaluation, which is intended to evaluate a current working state of the target component. The evaluation of the target component in terms of monitoring statuses is monitoring status evaluation, which is intended to evaluate performance of the target component in a specific machining process or performance of a core component inside the machine tool. The evaluation of the target component in terms of design parameters is design parameter evaluation, which is intended to evaluate design performance of the target component.

For example, in the working condition evaluation, the monitoring status evaluation, and the design parameter evaluation, evaluation may be performed at multiple levels from top to bottom of the target component, to generate multi-level evaluation data. The embodiments of the present disclosure are not limited by the specific execution process of the working condition evaluation, the monitoring status evaluation, and the design parameter evaluation.

Based on the above, by evaluating the target component in terms of working conditions, monitoring statuses, and design parameters, evaluation data of the target component is obtained in terms of an overall working condition level, a partial core subcomponent/process level, and design parameters, respectively, and then overall evaluation data is obtained based on the evaluation data, so that multi-level, multi-angle evaluation of the target component from top to bottom, from the whole to the part, from the whole machine to a component, and from the overall process to a sub-process may be realized, so as to reflect characteristics and statuses of the machine tool more comprehensively, and realize an accurate and flexible evaluation mechanism for the machine tool, which is also conducive to later optimization based on the evaluation results.

In some embodiments, the target component includes, for example, a cutter of the machine tool, and the aforementioned machine tool evaluation method may be described in more detail, for example.

The step of obtaining the target data set of the cutter includes, for example, dividing the original data set based on a machining process of the tool to obtain at least one data subset corresponding to at least one machining process.

The step of obtaining the feature data set of the cutter includes: extracting data features of data in the at least one data subset, and the data features include at least one of a cosine similarity trend, an average feature trend, and a peak feature trend.

The step of generating the evaluation result of the cutter includes: evaluating the cutter based on the data features of the data in the at least one data subset to obtain a process evaluation result of the cutter in the at least one sub-process, generating an evaluation result of the cutter based on the process evaluation result.

Based on the above, when the target component is a cutter component, based on the type information (cutter) and the attribute information (total machining process) of the cutter component, by dividing the original data set of the cutter based on the machining process to obtain the data subset corresponding to the machining process, extracting the data features of the data subset in the subsequent processing, and generating the evaluation result of the cutter based on the process evaluation result of the cutter in at least one sub-process, for a specific target component, i.e., the cutter, a rule for evaluating various processes may be set flexibly based on its type and attributes, thereby well realizing evaluation of the cutter, improving accuracy of the evaluation and management, as well as providing a good robustness.

In some embodiments, the preset management rule corresponds to a target monitoring rule of the target component, and managing the target component according to the preset management rule includes: implementing status monitoring and abnormality detection of the target component based on the target monitoring rule.

The status monitoring is intended to characterize a process of tracking and monitoring a real-time status of the machine tool. For example, the real-time status of the target machine tool may be visually presented based on features and monitoring signals of various components of the machine tool in the evaluation result, thereby providing online tracking of the components of the machine tool. Furthermore, different levels of monitoring may be set according to importance, severity and priority of each component of the machine tool, and different levels, for example, correspond to different response mechanisms (e.g., image text instructions or sound alarms), response speeds and response logics, which makes it possible to set corresponding monitoring and management methods according to different component characteristics.

For example, status monitoring may be achieved through a customized system, or it may also interact with a status monitoring system (SCADA system) to achieve corresponding predictive alarms.

The abnormality detection is intended to characterize detecting abnormalities of the machine tool based on characteristics of the machine tool and user needs, to detect, identify, explore and record most abnormal symptoms in the first time, so as to effectively handle them.

Depending on actual needs, for example, the abnormality detection may be implemented based on a set abnormality detection logic and algorithm. In general, the detected abnormalities include, for example: sudden failures such as collisions, fractures, and chipping; gradual failures such as wear, imbalance, looseness, chattering, runout, and poor lubrication; and various maintenance operations, such as shutdowns, overhauls, mold changes, material changes, process changes, working conditions changes and component replacement. It should be understood that the embodiments of the present disclosure are not limited by the specific content of the abnormality detection.

For example, the abnormality detection may be performed by a customized system, or the abnormality detection may be performed by reusing other systems, or abnormality detection data from other systems may be acquired. The embodiments of the present disclosure are not limited by the specific execution manner of the abnormality detection.

Based on the above, a real-time status data tracking of the machine tool can be realized based on the evaluation result of the machine tool, and an abnormal status of the machine tool can be detected and processed in time, so as to achieve good management of the working status and performance of the machine tool, improve efficiency and quality of management of the machine tool, and realize intelligent management.

Figure 5:
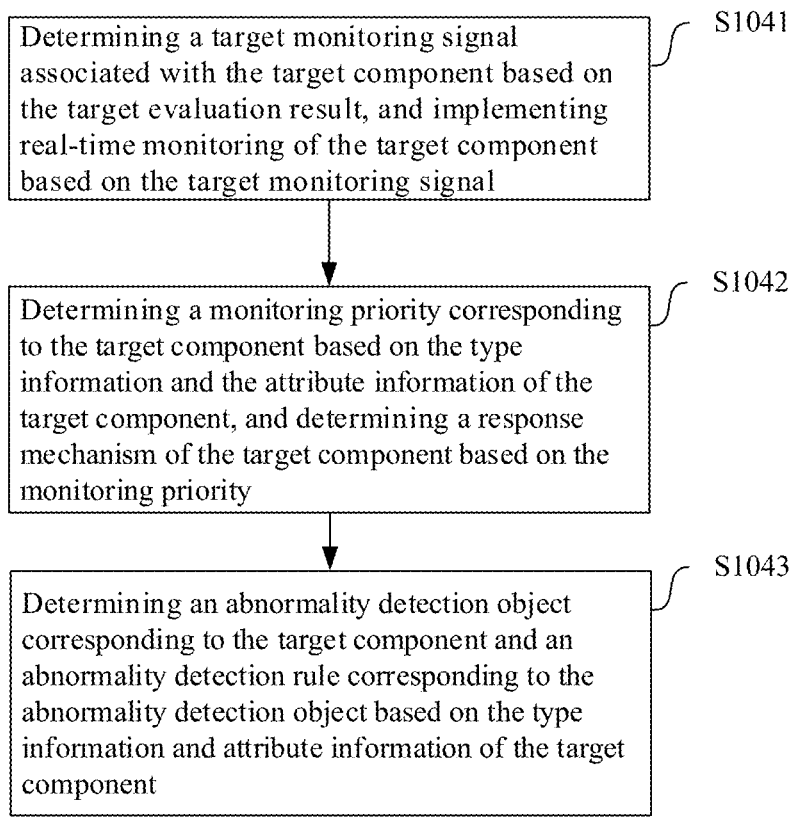
FIG. 5 shows an exemplary flowchart of a process S104 of status monitoring and abnormality detection of the target component according to some embodiments of the present disclosure.

In some embodiments, the process of implementing status monitoring and abnormality detection of the target component based on the target monitoring rule may be described in more detail, for example. FIG. 5 shows an exemplary flowchart of the process S104 of the status monitoring and abnormality detection of the target component according to an embodiment of the present disclosure.

Referring to FIG. 5, for example, in step S1041, a target monitoring signal associated with the target component is determined based on the target evaluation result, and real-time monitoring of the target component is implemented based on the target monitoring signal.

The target monitoring signal is intended to characterize a signal associated with the status of the target component. For example, for a cutter component, the target monitoring signal may be, for example, a torque signal of a lathe spindle. The embodiments of the present disclosure are not limited by the specific composition of the target monitoring signal.

The real-time monitoring is intended to characterize continuous monitoring of the target monitoring signal within a certain period of time. For example, the target monitoring signal may be continuously collected, or the signal may also be sampled in a predetermined period. The embodiments of the present disclosure are not limited by the specific implementation of the real-time monitoring.

In step S1042, a monitoring priority corresponding to the target component is determined based on the type information and the attribute information of the target component, and a response mechanism of the target component is determined based on the monitoring priority.

The monitoring priority is intended to characterize importance of the target component in the machine tool system, for example, the priority may include high, medium, and low. The embodiments of the present disclosure are not limited by the specific composition of this priority.

The response mechanism is intended to characterize a processing method for the target component when there is a problem with the target monitoring signal of the target component (e.g., when the target monitoring signal exceeds a safety threshold range). For example, it may include an abnormality alarm mode, an abnormality response speed and an abnormality handling logic.

The process of determining the response mechanism of the target component based on the monitoring priority may be described in more detail, for example. For example, a cutter component of a lathe may be set to have a high priority, and for example, when the target monitoring signal of the cutter is a torque signal of the lathe spindle, if an abnormality is found in the torque signal of the lathe spindle, based on the high priority, the lathe may perform signal abnormality alarm, for example, by flashing an indicator light and a whistle alarm, adopt the response speed of response within 1 s, and adopt the abnormality processing logic of sending information to main control equipment and suspending the technical process of the cutter.

Further referring to FIG. 5, in step S1043, an abnormality detection object corresponding to the target component and an abnormality detection rule corresponding to the abnormality detection object are determined based on the type information and attribute information of the target component.

The abnormality detection and its exemplary composition are as described above and will not be repeatedly described herein. The abnormality detection object is intended to characterize a specific object content of the abnormality detection set for the target component based on actual needs. The abnormality detection object may be specified by the user according to actual needs or may also be automatically generated by a management system based on actual needs. The embodiments of the present disclosure are not limited by the specific generation method and composition of the abnormality detection object.

The abnormality detection rule is intended to characterize a specific method and step used to realize detection of the abnormality detection object. For example, the abnormality detection object may be input to a preset algorithm, and a corresponding abnormality detection rule may be generated based on the preset algorithm and based on analysis of the abnormality detection object. Or, the abnormality detection rule may also be generated based on other methods, and the embodiments of the present disclosure are not limited by the specific content of the abnormality detection rule.

It should be understood that the foregoing steps S1041, S1042, and S1043 may be executed in order, or may be executed in reverse order, or may be executed in parallel, for example. The embodiments of the present disclosure are not limited by the specific execution order of the steps S1041, S1042, and S1043.

It should be understood that the foregoing only provides an exemplary process of status monitoring and abnormality detection. Other methods may also be used to implement status monitoring and abnormality detection depending on actual needs, and the embodiments of the present disclosure are not limited by the specific methods adopted.

Based on the above, by determining the target monitoring signal associated with the target component based on the target evaluation result, real-time monitoring of the target component is realized based on the target monitoring signal. The priority of the target component is determined based on the type information and attribute information of the target component, and thus the response mechanism of the target component is determined, and the abnormality detection object and abnormality detection rule of the target component are determined based on the type information and attribute information, so that in the process of managing the target component, a target status signal of the target component can be tracked in real time, and when the target status signal has a problem, a corresponding response mechanism is called for processing. The abnormality detection object of the target component can also be detected and processed in time based on actual needs. In this way, flexible management of the target component is realized in all directions and multiple angles.

In some embodiments, implementing management of the machine tool based on the evaluation result of the machine tool includes: the preset management rule corresponds to a health management rule of the target component, and managing the target component according to the preset management rule includes: implementing health management of the target component based on the health management rule.

The health management is intended to characterize control and management of each target component of the machine tool, so as to realize a healthy operation of the machine tool or make the machine tool have a higher degree of health. The healthy operation of the machine tool herein may be understood as a working performance, useful life, and degree of wear of the machine tool and its components are all in good condition.

For example, a customized system may be used for the health management, or other systems may be reused for the health management, or health management data from other systems may be obtained. The embodiments of the present disclosure are not limited by the specific implementation manner of the health management.

Based on the above, based on the evaluation result of the machine tool, it is possible to realize management of a health status of each target component of the machine tool, so as to effectively and timely replace the cutter, modify the work flow, etc., thereby improving the health status of each target component in the machine tool and better guaranteeing reasonable and efficient operation of the machine tool and its internal components.

For example, in some embodiments, implementing the health management of the target component based on the health management rule includes: first, generating a health evaluation result of the target component based on the target evaluation result, the attribute information and the type information of the target component; establishing a useful life prediction model of the target component based on the health evaluation result; realizing regular replacement of the target component based on the useful life prediction model.

The health evaluation result is intended to characterize information related to a health degree of the target component, which may include, for example, performance indicators, design parameter indicators and evaluation information that can reflect the degree of health of the target component. The embodiments of the present disclosure are not limited by the specific composition and source of the health evaluation result.

By generating the health evaluation result based on the target evaluation result, the attribute information and type information of the target component and establishing the useful life model of each target component based on the health evaluation result, use and management of each target component can be better realized, so as to help maximize performance of each target component while avoiding damage to them caused by overuse.

In some embodiments, the preset management rule includes a maintenance and optimization strategy corresponding to the target component and managing the target component according to the preset management rule comprises: implementing maintenance and optimization of the target component based on the maintenance and optimization strategy.

For example, by interacting with a maintenance and scheduling system, reusing related functions of the maintenance and scheduling system, the entire maintenance service chain can be organized and linked to form an effective process cycle to ensure that different maintenance ways are adopted for different components of the machine tool. Or a customized maintenance system may be used for related maintenance operations. The embodiments of the present disclosure are not limited by the specific execution manner of the maintenance process.

In some embodiments, the optimization process may include, for example, at least part of the following steps: signal calibration and optimization, machining process evaluation and optimization, working status monitoring and improvement, and design parameter optimization.

It should be understood that other optimizations may be performed depending on actual needs. The embodiments of the present disclosure are not limited by the specific optimization process executed.

In some embodiments, the process of implementing optimization of the target component based on the maintenance and optimization strategy may be described in more detail, for example. For example, based on the evaluation result of the machine tool, the type information and attribute information of the target component, a design simulation and optimization model of the machine tool is developed by modeling, statistical analysis and/or machine learning related algorithms. Accordingly, relevant design parameters of the machine tool can be improved.

In some embodiments, the process of implementing maintenance of the machine tool based on the evaluation result of the machine tool may be described in more detail, for example. For example, if the evaluation of the machine tool is the health status evaluation of the machine tool, and a health status data set is obtained based on the evaluation, the maintenance process of the machine tool includes: first, determining at least one core problem component based on the health status data set and a user input; then, determining a maintenance mechanism of the core problem component based on type information and attribute information of the at least one core problem component, and implementing maintenance and optimization of the at least one core problem component based on the maintenance mechanism.

Based on the above, after the evaluation of the machine tool is realized based on the foregoing methods, a corresponding decision is made based on the evaluation result and measures are taken to locate faults, eliminate the faults, solve problems, arrange maintenance, and optimize the process and design, so that maintenance and optimization of the machine tool can be realized effectively, thereby improving performance and reliability of the machine tool.

In some embodiments, the target component includes a cutter of the machine tool, and management of the cutter includes at least one of execution threshold setting of at least one sub-process of the cutter, detection threshold setting of the cutter, and useful life model establishment of the cutter.

The execution threshold setting of at least one sub-process of the cutter refers to setting an execution threshold of at least one sub-process of the cutter, and the execution threshold represents the maximum number of times the cutter executes the sub-process.

The detection threshold setting of the cutter refers to setting a data threshold of state detection data of the cutter. The cutter detection threshold may, for example, characterize a boundary value of wear, collision and damage of the cutter, so as to achieve good detection and timely processing of the cutter.

A cutter useful life model is intended to characterize an estimation of useful life of the cutter. The useful life model may be, for example, a graph, or may be an algorithm or a corresponding matrix formula. The embodiments of the present disclosure are not limited by the specific composition and content of the cutter useful life model.

Figure 6:
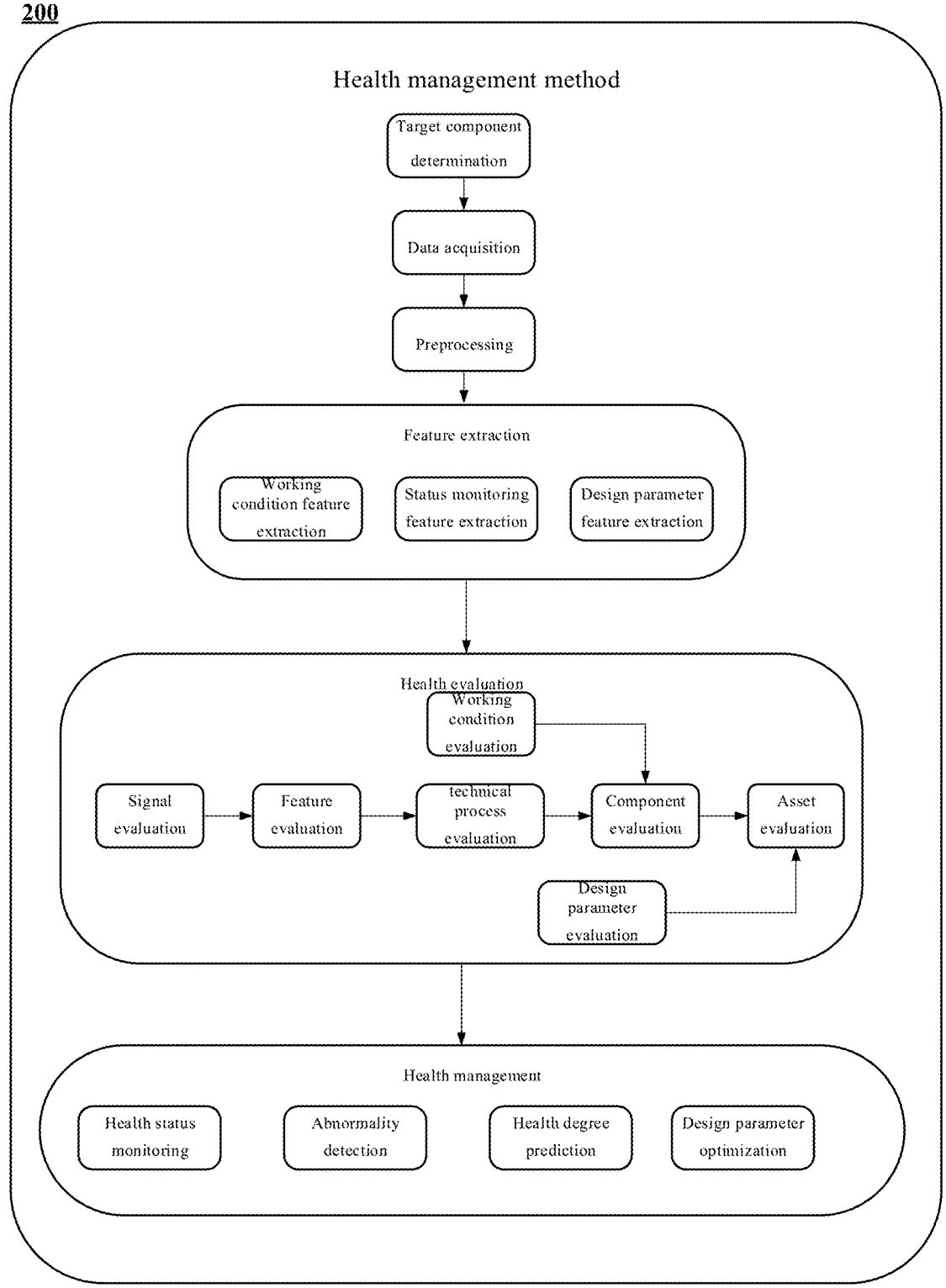
FIG. 6 shows an exemplary flowchart of a machine tool health management method 200 according to some embodiments of the present disclosure.

Next, the above method will be explained in more detail in combination with specific application scenarios. FIG. 6 shows an exemplary flowchart of a machine tool health management method 200 according to an embodiment of the present disclosure.

The machine tool health management method 200 is mainly based on, for example, performance of a machine tool (here, a drilling machine) in the process of performing drilling of six-hole parts for an engine, so as to monitor, evaluate, and manage the machining process, key components and the machine tool itself. And, the determined target component includes, for example, a cutter of the machine tool.

First, an evaluation result of the machine tool will be generated according to a preset processing rule based on the target component. For example, type information and attribute information of the machine tool are acquired. For example, the type information of the cutter of the machine tool is: a cutter, and the attribute information is: executing a drilling process of a six-hole part.

Figure 7:
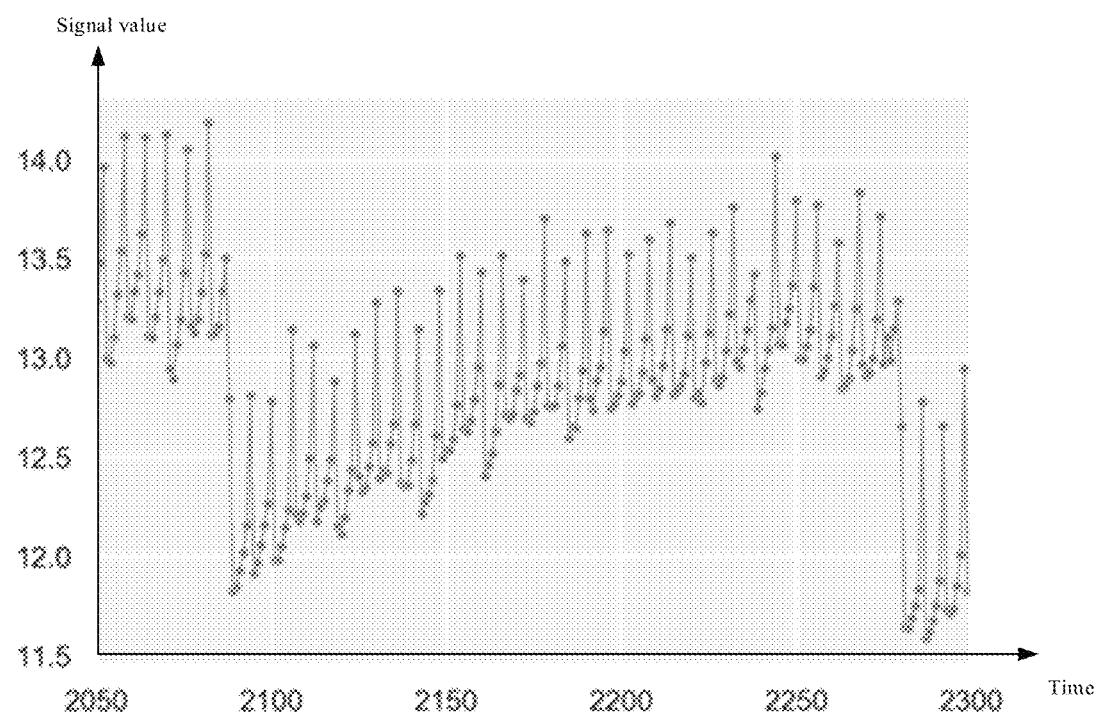
FIG. 7 shows a schematic diagram of torque signals collected according to the machine tool health management method 200 of some embodiments.

Based on the type information and attribute information, for example, target working condition data, target status monitoring data, and target design parameter data corresponding to the target component may be determined and acquired. In this application scenario, the collected status monitoring data includes, for example, a torque signal collected on a spindle of the machine tool at a sampling frequency of 100 Hz (a change of the torque signal may reflect the operation of the spindle of the machine tool and is related to wear of the cutter of the machine tool). FIG. 7 shows a schematic diagram of the torque signal collected according to the machine tool health management method 200.

Thereafter, for example, in the preprocessing process, based on a target preprocessing rule matching the type information and attribute information of the target component, a preprocessing operation is performed on the collected multiple raw data. The preprocessing process includes, for example, the aforementioned data division process, for example, the original data is divided based on a processing process. Specifically, based on characteristics of the drilling process of the six-hole part, an overall technical process of the six-hole part is composed of six drilling sub-processes. For example, the obtained data is divided according to different drilling sub-processes to which it belongs, so as to perform different processing and evaluation for different processing characteristics of different sub-processes in subsequent processing.

Moreover, the preprocessing process further includes, for example, other preprocessing operations as described above, such as data de-duplication, data noise reduction, data encoding, and data filtering. Based on a type and characteristics of the data, in this embodiment, algorithms based on statistics and boxplots may be mainly used in data noise reduction, for example, and median filtering may be mainly used in data filtering.

Thereafter, after the preprocessing, feature extraction is performed on the preprocessed preferred data in a feature extraction process. Based on this specific application scenario, the feature extraction here is, for example, a time domain feature extraction operation, and according to signal characteristics, a mean, a standard deviation, a maximum value, a root mean square value and a waveform index are selected as features to be extracted in a single feature extraction processing.

Figure 8A:
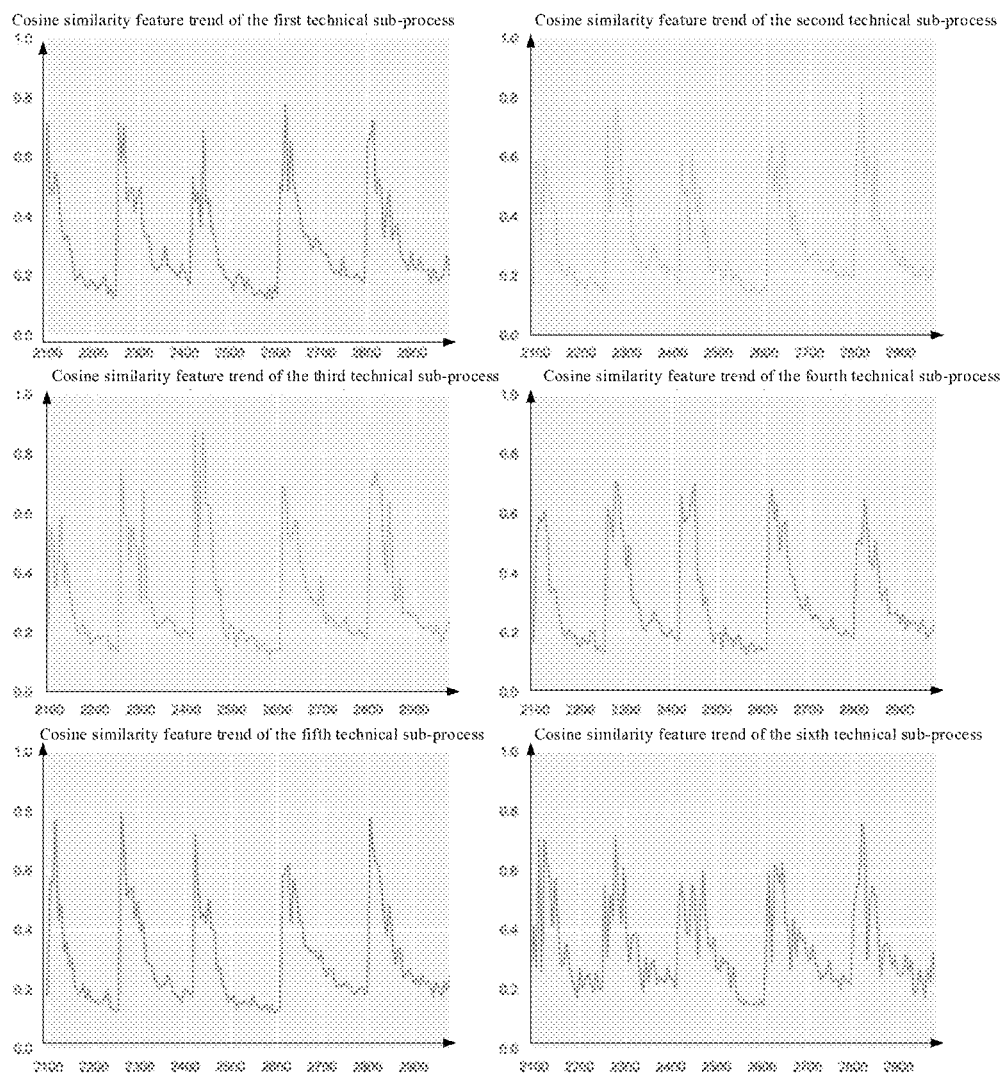
FIG. 8A shows cosine similarity feature trend graphs obtained by the machine tool health evaluation method 200 performing feature extraction on preprocessed data in some embodiments.

FIG. 8A shows cosine similarity feature trend graphs obtained by the machine tool health evaluation method 200 performing feature extraction on preprocessed data. Based on six sub-process data sets obtained in the preprocessing (corresponding to process manufacturing processes of the six holes, respectively), feature extraction is performed on the data of the six data sets, respectively, and cosine similarity feature trend graphs of the six sub-processes are obtained as shown in FIG. 8A. The horizontal axis of the trend graph of each technical sub-process may represent time, for example, and the vertical axis may represent specific feature values, for example. For example, multiple types of feature data may also be extracted for this sub-process, including but not limited to its average feature trend, peak feature trend, and so on.

Figure 8B:
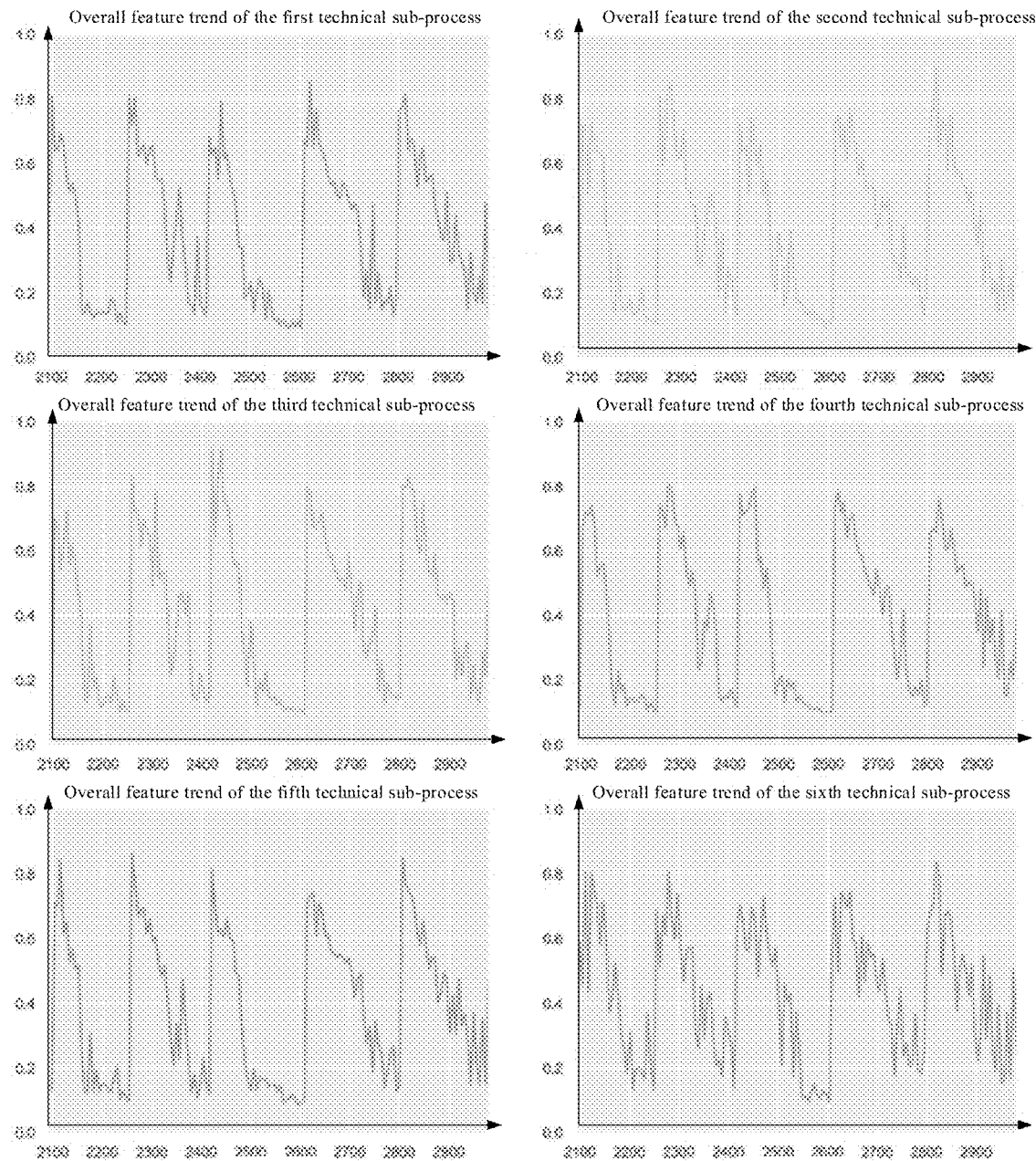
FIG. 8B shows overall feature trend graphs of respective sub-processes after feature fusion in some embodiments.

If features for each sub-process in multiple dimensions are extracted respectively, for example, multiple features corresponding to one sub-process may be fused by feature fusion processing, to obtain an overall feature of the sub-process. FIG. 8B shows overall feature trend graphs of respective sub-processes after feature fusion, in which the horizontal axis in the trend graph of each technical sub-process may represent time, for example, and the vertical axis may represent specific feature quantity values, for example.

Figure 8C:
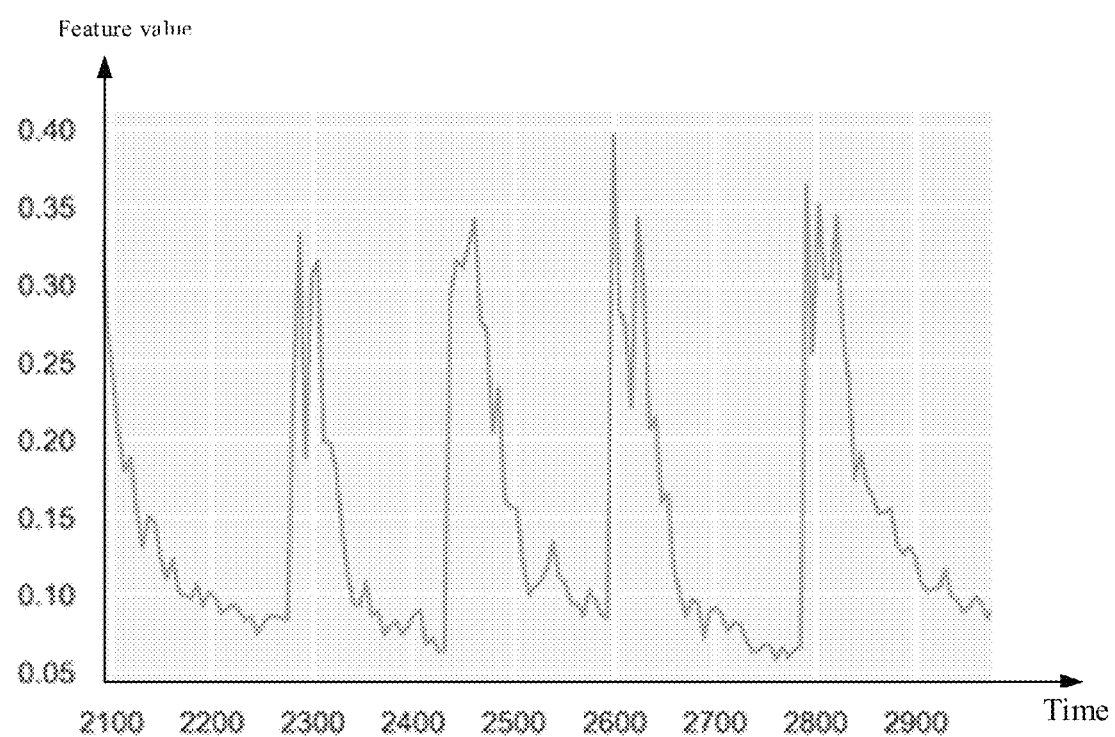
FIG. 8C shows an overall feature trend graph of a single sub-process after feature dimensionality reduction in some embodiments.

Thereafter, for each sub-process, for example, feature dimensionality reduction processing may be performed on the overall feature of the sub-process, to filter out non-necessary feature quantities, simplify the number of dimensions of the feature, and increase the speed of subsequent processing. FIG. 8C shows an overall feature trend graph of a single sub-process after feature dimensionality reduction, in which the horizontal axis may represent time, for example, and the vertical axis may represent specific feature quantity values after dimensionality reduction, for example.

After the feature processing is performed, health evaluation is performed based on the extracted features. Specifically, for example, it is performed at different levels such as signal evaluation (characterization evaluation directly based on collected data), feature evaluation (evaluation based on feature data after feature extraction), technical process evaluation (evaluation of a specific technical process), component evaluation (evaluation of core components) and asset evaluation (i.e., evaluation of a target object, for example, a health status of the machine tool in this application scenario), and a final evaluation result of the machine tool is generated based on evaluation results of the above levels. Moreover, different levels of evaluation may be related to each other. For example, a result of the component evaluation may be comprehensively generated based on a working condition evaluation result and a technical process evaluation result, and a result of the asset evaluation may be comprehensively generated based on the result of the component evaluation and a design parameter evaluation result, for example. The above-mentioned multiple evaluations at multiple levels may have, for example, the execution flow and execution sequence shown in FIG. 6. However, the embodiments of the present disclosure are not limited thereto, and other execution orders may also be adopted.

Figure 9:
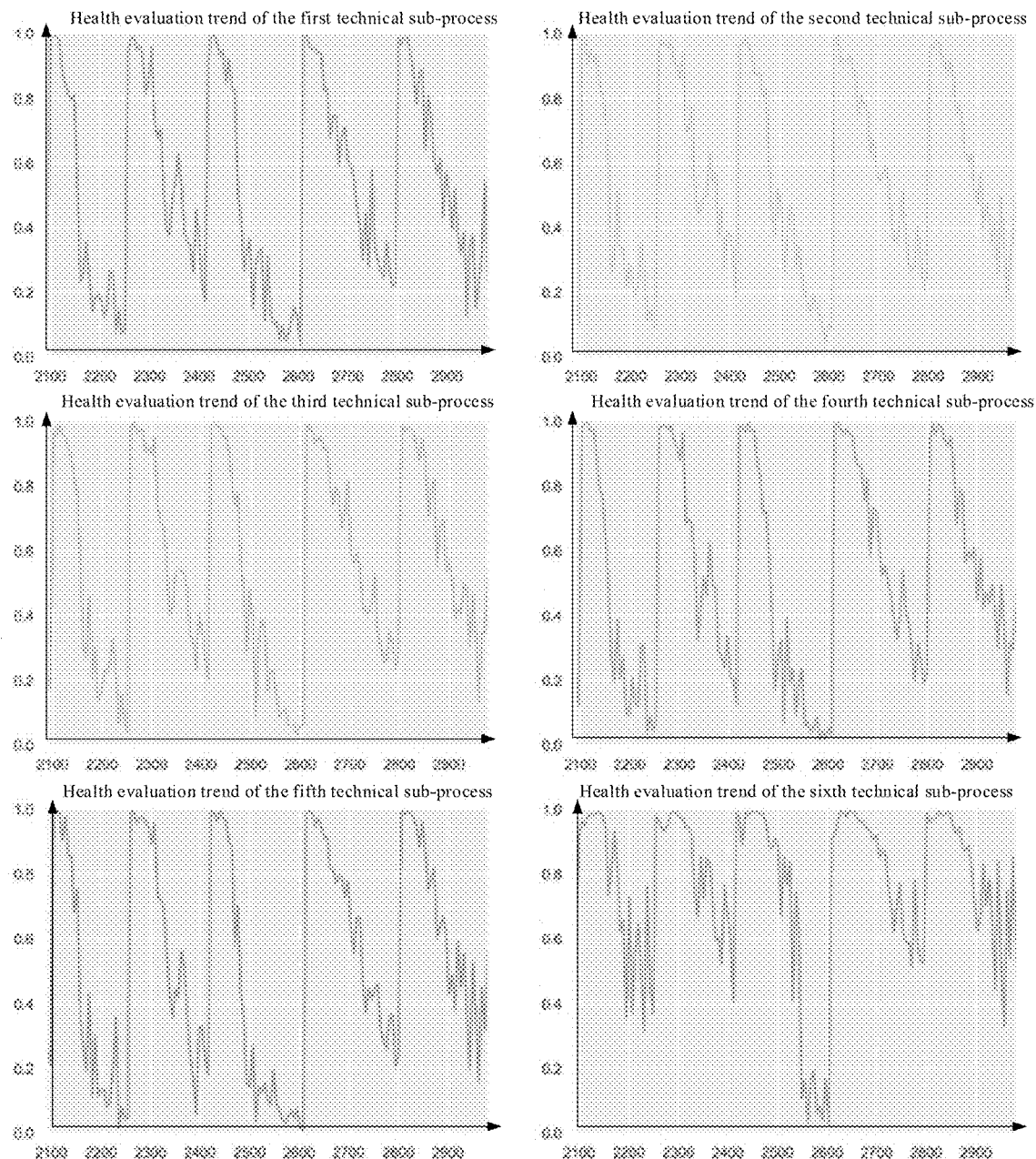
FIG. 9 shows schematic diagrams of health degree trends of a cutter component in respective sub-processes according to some embodiments of the present disclosure.

For example, the health evaluation result may be described in more detail. FIG. 9 shows schematic diagrams of health degree trends of a cutter component in respective sub-processes according to an embodiment of the present disclosure, in which the change in the health degree of the cutter component in each sub-process may be well illustrated, the horizontal axis represents the time t, and the vertical axis represents calculated health values of the cutter (e.g., 1 is the best, 0 is the lowest). A drop in the waveform indicates that the cutter's health degree has declined with use (e.g., it is worn), and the almost vertical rising waveform indicates an operation of replacing the cutter: the measured health values of the cutter after the cutter is replaced returns to the best state (it can be seen from the figure that it is close to 1) again, and then the wear continues to decrease with use.

Figure 10:
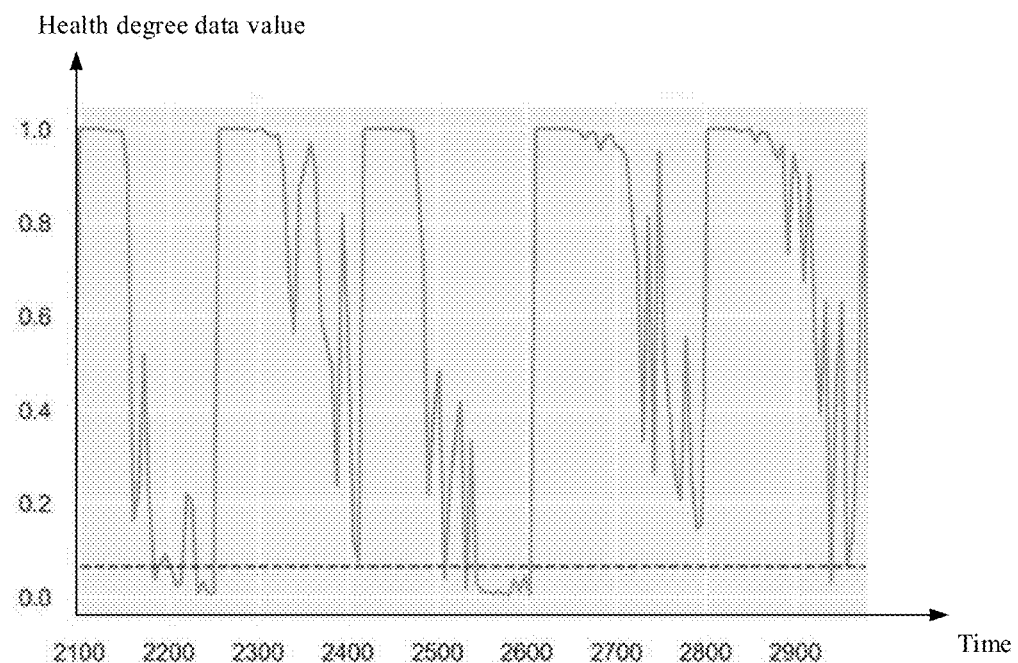
FIG. 10 shows a schematic diagram of status monitoring of respective sub-processes with a detection threshold in some embodiments.

Thereafter, a management process of the machine tool is realized based on the health evaluation result, and the management process includes, for example, processes such as health status monitoring, abnormality detection, health degree prediction, design parameter optimization and the like. For example, the process of health status monitoring and abnormality detection may include, for example, a process of detection threshold setting of at least one cutter sub-process. Specifically, by setting appropriate thresholds, logics and other model parameters, effective health status monitoring and abnormality detection of the cutter's health status in each technical sub-process is realized. FIG. 10 shows a schematic diagram of status monitoring of respective sub-processes with a detection threshold, in which the set threshold is shown by a dashed line, and the threshold is set as a boundary value that characterizes tool wear, collision, and damage. For example, when it is lower than the threshold, an alarm or a cutter replacement operation may be performed, so as to realize accurate monitoring and detection of the health status of the cutter, and timely and effective processing can be performed.

Figure 11:
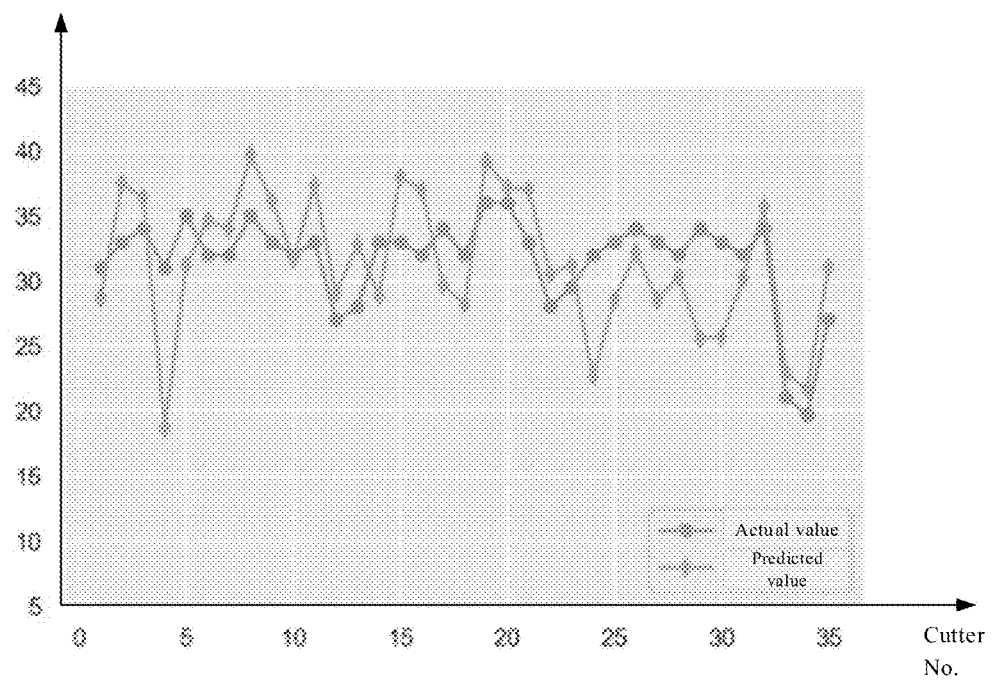
FIG. 11 shows a prediction and measurement data graph of a cutter technical process according to some embodiments of the present disclosure.

In addition, during the health management process, the health degree prediction may also include, for example, predicting the total number of technical processes that can be executed by different cutters, that is, for a specific cutter, when it performs a specific technical process operation, predicting the maximum number of times it can execute the technical process operation (after that the cutter will be severely worn or unable to meet a predetermined quality standard). FIG. 11 shows a prediction and measurement data graph of a cutter technical process according to an embodiment of the present disclosure, in which the horizontal axis is, for example, the number of the cutter (e.g., corresponding to different cutter types), and the vertical axis is the maximum number of times that a specific technical process can be executed for the cutter. Moreover, two different node broken lines are used to show predicted execution times and actual detection execution times respectively. Based on this graph, management of the machine tool can be better realized, and original predicted data can be calibrated based on the actual measured data in time, to achieve more precise cutter management control and improve the health degree of the machine tool and its related components.

Figure 12:
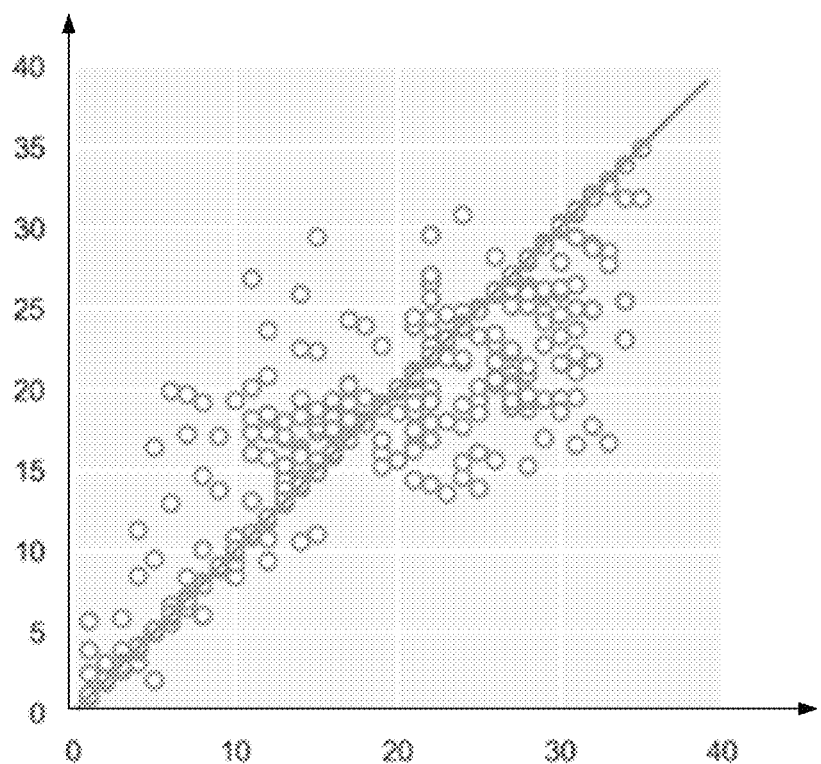
FIG. 12 shows a comparison graph between predicted useful life and actual useful life of cutters according to some embodiments of the present disclosure.

In addition, in the process of design parameter optimization of the machine tool management, for example, based on the aforementioned health evaluation result, a model (e.g., a remaining useful life model, RUL) may be established between the extracted features and useful life of the tool, so as to dynamically predict the useful life of the tool work under real-time working conditions. FIG. 12 shows a comparison graph between predicted useful life and actual useful life of cutters according to an embodiment of the present disclosure. Predicted reference values of useful life of a certain type of cutters is shown in a straight line, and comparison of predicted values and actual measured values of useful life of multiple cutters of this type are shown in scattered points. The horizontal axis and the vertical axis represent the measured and predicted life values of the useful life, respectively. Therefore, a relationship between an actual useful life and a predicted useful life of a cutter may be intuitively observed based on the graph, so that the cutter can be replaced and maintained in time; it can also be used for quality inspection and management of the same batch of cutters.

For example, for FIG. 12, on the one hand, since most of the scattered points are distributed along the diagonal, it shows a good predictive performance for the useful life of the tools. On the other hand, there are some scattered points that greatly deviate from the line segment, indicating that the performance of this batch of tools is unstable and inconsistent. Therefore, the design and manufacturing may need to be optimized and improved accordingly.

Based on the above, by providing a machine tool management method based on condition monitoring, multi-signal, multi-working-condition, and multi-dimensional fusion of original signal data can be realized. More comprehensive and hierarchical methods and indicators can be obtained to reflect a status of the machine tool and used to manage performance of the machine tool at each level, so as to provide more accurate and timely warnings, alarms, feedback and optimization strategies. Thereby, it is possible to gradually solve the processing problems caused by parts, working conditions and processing technical process, and ultimately reduce the processing cost, improve the quality and increase the efficiency.

Moreover, the use of this method can monitor, evaluate and improve the machine tool in a continuous closed loop, which can enhance the performance, service capabilities and solution capabilities of related products. In addition, the acquired data may also be processed and modeled based on big data or machine learning, so as to realize management and optimization of the machine tool in a digital and intelligent way.

Figure 13:
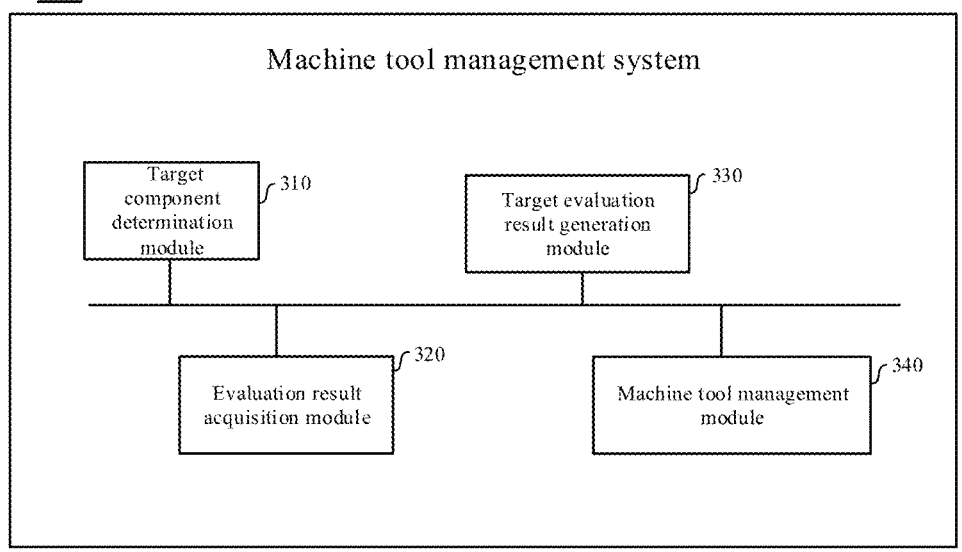
FIG. 13 shows a schematic block diagram of a machine tool management system 300 according to some embodiments of the present disclosure.

According to another aspect of the present disclosure, a machine tool management system is also proposed. FIG. 13 shows a schematic block diagram of a machine tool management system 300 according to an embodiment of the present disclosure.

Referring to FIG. 13, the machine tool management system 300 includes a target component determination module 310, an evaluation result acquisition module 320, a target evaluation result generation module 330, and a machine tool management module 340.

Moreover, the target component determination module 310 is configured to execute the process of step S101 in the machine tool management method of FIG. 1 to determine at least one target component of the machine tool.

The evaluation result acquisition module 320 is configured to execute the process of step S102 in the machine tool management method of FIG. 1, to generate an evaluation result of the machine tool according to a preset processing rule based on the determined at least one target component.

The target evaluation result generation module 330 is configured to execute the process of step S103 in the machine tool management method of FIG. 1, for each target component of one or more target components in the at least one target component, to acquire a target evaluation result corresponding to the target component from the evaluation result of the machine tool.

The machine tool management module 340 is configured to execute the process of step S104 in the machine tool management method of FIG. 1, for each target component of one or more target components in the at least one target component, to determine a preset management rule based on the target evaluation result and type information and attribute information of the target component, and manage the target component according to the preset management rule Based on the above, in this application, by determining at least one target component of the machine tool, generating the evaluation result of the machine tool based on the target component, acquiring the target evaluation result corresponding to the target component from the evaluation result of the machine tool, and synthesizing the target evaluation result, the type information and attribute information of the target component to determine the preset management rule to realize management of the target component, in the process of managing target components of the machine tool, preset management rules suitable for the target components may be well determined based on current evaluation results of different target components and the target components' own characteristics (type information), actual application scenarios and requirements (attribute information) to realize management of the target components, thereby realizing flexible management of the target components and improving robustness and accuracy in the management of the machine tool.

In some embodiments, the machine tool management system may also perform the machine tool management method described above to realize the corresponding functions described above.

According to another aspect of the present invention, there is also provided a non-volatile computer-readable storage medium on which computer-readable instructions are stored, and when the instructions are executed by a computer, the aforementioned method may be executed, and the functions as described before may be provided.

The program part in the technology may be regarded as a "product" or "article" in the form of executable code and/or related data, which is participated in or realized by a computer-readable medium. Tangible and permanent storage media may include any memory or storage used by computers, processors, or similar devices or related modules, for example, various semiconductor memories, tape drives, disk drives, or any similar device that can provide storage functions for software.

All software or part of it may sometimes communicate via a network, such as the Internet or other communication networks. Such communication may load software from one computer device or processor to another, for example, from a server or host computer of a machine tool evaluation device to a hardware platform of a computer environment, or other computer environments for realizing the system, or a system with similar functions related to providing information required for machine tool evaluation. Therefore, another medium that can transmit software elements may also be used as a physical connection between local devices, such as light waves, electric waves, electromagnetic waves, etc., to achieve propagation through cables, optical cables, or air. Physical media used for carrier waves, such as cables, wireless connections, optical cables and the like, may also be considered as media carrying software. Unless the usage herein limits a tangible "storage" medium, other terms that refer to a computer or machine "readable medium" all refer to a medium that participates in the process of executing any instructions by a processor.

This application uses specific words to describe the embodiments of the application. For example, "first/second embodiment", "an embodiment", and/or "some embodiments" mean a certain feature, structure, or characteristic related to at least one embodiment of the present application. Therefore, it should be emphasized and noted that "an embodiment" or "one embodiment" or "an alternative embodiment" mentioned twice or more in different positions in this specification does not necessarily refer to the same embodiment. In addition, some features, structures, or characteristics in one or more embodiments of the present application may be appropriately combined.

In addition, those skilled in the art may understand that various aspects of this application may be explained and described through a number of patentable categories or situations, including any new and useful process, machine, product, or combination of substances, or any new and useful improvements to them. Accordingly, various aspects of the present application may be completely executed by hardware, completely executed by software (including firmware, resident software, microcode, etc.), or executed by a combination of hardware and software. The above hardware or software may be called a "data block", "module", "engine", "unit", "component" or "system". In addition, various aspects of this application may be embodied as a computer product located in one or more computer-readable media, and the product includes computer-readable program codes.

Unless otherwise defined, all terms (including technical and scientific terms) used herein have the same meaning as commonly understood by those of ordinary skill in the art to which the present invention belongs. It should also be understood that terms such as those defined in ordinary dictionaries should be interpreted as having meanings consistent with their meanings in the context of related technologies and should not be interpreted in idealized or extremely formalized meanings, unless explicitly stated as such herein.

The above is a description of the present invention and should not be considered as a limitation to it. Although several exemplary embodiments of the present invention have been described, those skilled in the art will readily understand that many modifications may be made to the exemplary embodiments without departing from the novel teachings and advantages of the present invention. Therefore, all these modifications are intended to be included in the scope of the present invention defined by the claims. It should be understood that the above is an illustration of the present invention and should not be considered as limited to the specific embodiments disclosed, and modifications to the disclosed embodiments and other embodiments are intended to be included in the scope of the appended claims. The present invention is defined by the claims and their equivalents.

What is claimed is:

1. A machine tool management method, comprising:
   determining at least one target component of a machine tool;
   generating an evaluation result of the machine tool according to a preset processing rule based on the determined at least one target component;
   for each target component of one or more target components in the at least one target component,
      acquiring a target evaluation result corresponding to the target component from the evaluation result of the machine tool;
      determining a preset management rule based on type information and attribute information of the target component and the target evaluation result, and managing the target component according to the preset management rule.

2. The machine tool management method of claim 1, wherein generating the evaluation result of the machine tool according to the preset processing rule based on the determined at least one target component comprises:
   for each target component:
      acquiring the type information and the attribute information of the target component;

determining and acquiring target working condition data, target status monitoring data, and target design parameter data corresponding to the target component based on the acquired type information and attribute information;

generating an original data set based on the target working condition data, the target status monitoring data and the target design parameter data;

preprocessing the original data set based on a target preprocessing rule matching the type information and the attribute information of the target component, to obtain a target data set;

performing feature extraction on the target data set based on a target feature extraction rule matching the type information and the attribute information of the target component, to obtain a feature data set;

performing multi-level evaluation of the target component based on a multi-level evaluation rule matching the type information and the attribute information of the target component and the feature data set of the target component, to generate an evaluation result of the target component;

generating the evaluation result of the machine tool based on the evaluation result of the at least one target component.

3. The machine tool management method of claim 1, wherein the preset management rule corresponds to a target monitoring rule of the target component, and managing the target component according to the preset management rule comprises:

implementing status monitoring and abnormality detection of the target component based on the target monitoring rule.

4. The machine tool management method of claim 1, wherein the preset management rule corresponds to a health management rule of the target component, and managing the target component according to the preset management rule comprises:

implementing health management of the target component based on the health management rule.

5. The machine tool management method of claim 1, wherein the preset management rule includes a maintenance and optimization strategy corresponding to the target component, and managing the target component according to the preset management rule comprises:

implementing maintenance and optimization of the target component based on the maintenance and optimization strategy.

6. The machine tool management method of claim 2, wherein, for each target component, generating the original data set based on the target working condition data, the target status monitoring data and the target design parameter data comprises:

performing synchronous processing in multiple dimensions on the target working condition data, the target status monitoring data, and the target design parameter data, to obtain the original data set; the multiple dimensions including a space dimension and a time dimension.

7. The machine tool management method of claim 2, wherein, for each target component, preprocessing the original data set based on the target preprocessing rule to obtain the target data set comprises:

determining a data division rule corresponding to the original data set based on the target working condition data in the original data set;

performing data division on the original data set based on the data division rule to obtain the target data set.

8. The machine tool management method of claim 2, wherein, for each target component, performing feature extraction on the target data set based on the target feature extraction rule to obtain the feature data set comprises:

extracting features of the target working condition data in the target data set to obtain working condition features of the target data set;

extracting features of the target status monitoring data in the target data set to obtain status monitoring features of the target data set;

extracting features of the target design parameter data in the target data set to obtain design parameter features of the target data set;

obtaining the feature data set of the target component based on the working condition features, the status monitoring features, and the design parameter features.

9. The machine tool management method of claim 2, wherein, for each target component, performing multi-level evaluation of the target component based on the multi-level evaluation rule and the feature data set of the target component to generate an evaluation result of the target component comprises:

performing multi-level evaluation of the target component in terms of working conditions, monitoring statuses, and design parameters, respectively, based on the feature data set of the target component to obtain evaluation data; and generating an overall evaluation data of the target component based on the evaluation data.

10. The machine tool management method of claim 1, wherein the target component includes a cutter of the machine tool, and management of the cutter includes at least one of execution threshold setting of at least one sub-process of the cutter, detection threshold setting of the cutter, and useful life model establishment of the cutter.

11. A machine tool management system, comprising:

a target component determination module configured to determine at least one target component of a machine tool;

an evaluation result acquisition module configured to generate an evaluation result of the machine tool according to a preset processing rule based on the determined at least one target component;

a target evaluation result generation module configured to, for each target component of one or more target components in the at least one target component, acquire a target evaluation result corresponding to the target component from the evaluation result of the machine tool;

a machine tool management module configured to, for each target component of one or more target components in the at least one target component, determine a preset management rule based on the target evaluation result and type information and attribute information of the target component, and manage the target component according to the preset management rule.

12. A non-transitory computer-readable storage medium comprising:

computer-readable instructions being stored on the non-transitory computer-readable storage medium, the instructions being executed by a computer that controls a machine tool, wherein at least one target component of a machine tool is determined;

an evaluation result of the machine tool according to a preset processing rule based on the determined at least one target component is generated;

for each target component of one or more target components in the at least one target component, a target evaluation result is acquired corresponding to the target component from the evaluation result of the machine tool;

a preset management rule based on type information and attribute information of the target component and the target evaluation result is determined, and the target component according to the preset management rule is managed.

* * * * *